United States Patent
Shivell et al.

(10) Patent No.: US 10,782,188 B2
(45) Date of Patent: Sep. 22, 2020

(54) WIRELESS CONTROL DEVICE HAVING A FACEPLATE WITH ILLUMINATED INDICIA

(71) Applicant: Lutron Technology Company LLC, Coopersburg, PA (US)

(72) Inventors: William Taylor Shivell, Breinigsville, PA (US); Matthew Philip McDonald, Phoenixville, PA (US); Alexander Wade Gage, Havertown, PA (US); Alan Simchayoff, Warrington, PA (US); Dmitriy Vinokurov, Upper Black Eddy, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 495 days.

(21) Appl. No.: 15/288,861

(22) Filed: Oct. 7, 2016

(65) Prior Publication Data

US 2017/0102493 A1 Apr. 13, 2017

Related U.S. Application Data

(60) Provisional application No. 62/239,741, filed on Oct. 9, 2015.

(51) Int. Cl.
*F21V 23/04* (2006.01)
*G01J 5/24* (2006.01)
(Continued)

(52) U.S. Cl.
CPC .............. *G01J 5/24* (2013.01); *F21V 23/005* (2013.01); *G01J 1/44* (2013.01); *G02B 6/006* (2013.01);
(Continued)

(58) Field of Classification Search
CPC ... G01J 5/24; G01J 1/44; H01H 13/83; H01H 2219/014; H01H 2219/062;
(Continued)

(56) References Cited

U.S. PATENT DOCUMENTS

| 4,918,577 A | 4/1990 | Furudate |
| 5,248,919 A | 9/1993 | Hanna et al. |

(Continued)

FOREIGN PATENT DOCUMENTS

WO   WO 2000/050807 A1   8/2000

*Primary Examiner* — Isiaka O Akanbi
*Assistant Examiner* — Fatima N Farokhrooz
(74) *Attorney, Agent, or Firm* — Condo Roccia Koptiw LLP

(57) ABSTRACT

A control device may include a removable faceplate, a planar printed circuit board (PCB), a structure located between the faceplate and the PCB, one or more LEDs (e.g., side firing LEDs) mounted to the PCB, and a light-guiding component. The structure may include an antenna configured to transmit or receive radio frequency signals. The faceplate may be configured to be mounted to the control device, and may include a light-conductive body and an opaque material provided on a front surface of the faceplate. At least one indicia may be engraved in the opaque material. The light-guiding component may include a planar portion and a curved portion. The planar portion may be located between the faceplate and the structure. The curved portion may extend between the LEDs on the printed circuit board and the planar portion to transmit light generated by the LEDs to the faceplate to illuminate the indicia.

16 Claims, 16 Drawing Sheets

(51) Int. Cl.
*G01J 1/44* (2006.01)
*H01H 13/83* (2006.01)
*H05B 47/19* (2020.01)
*F21V 23/00* (2015.01)
*F21V 8/00* (2006.01)
*H01Q 13/10* (2006.01)
*H05B 45/10* (2020.01)
*H05B 47/11* (2020.01)
*F21Y 115/10* (2016.01)

(52) U.S. Cl.
CPC ......... *G02B 6/0055* (2013.01); *G02B 6/0083* (2013.01); *H01H 13/83* (2013.01); *H05B 47/19* (2020.01); *F21V 23/0471* (2013.01); *F21Y 2115/10* (2016.08); *H01H 2219/014* (2013.01); *H01H 2219/062* (2013.01); *H01H 2223/04* (2013.01); *H01H 2300/03* (2013.01); *H01Q 13/10* (2013.01); *H05B 45/10* (2020.01); *H05B 47/11* (2020.01); *Y02B 90/224* (2013.01); *Y04S 20/14* (2013.01)

(58) Field of Classification Search
CPC ........... H01H 2223/04; H01H 2300/03; G02B 6/0083; G02B 6/0055; G02B 6/006; F21V 23/005; F21V 23/0471; H05B 33/0845; H05B 37/0218; Y02B 90/224; Y04S 20/14; H01Q 13/10; F21Y 2115/10; G08C 2201/12; G08C 2201/30
See application file for complete search history.

(56) References Cited

U.S. PATENT DOCUMENTS

| | | | |
|---|---|---|---|
| 5,301,090 A * | 4/1994 | Hed | G02B 6/001 362/558 |
| 5,584,556 A * | 12/1996 | Yokoyama | G02B 6/0036 349/62 |
| 5,905,442 A | 5/1999 | Mosebrook et al. | |
| 5,982,103 A | 11/1999 | Mosebrook et al. | |
| 6,336,825 B1 * | 1/2002 | Seefried | G02B 6/4204 439/488 |
| 6,642,452 B2 | 11/2003 | Masson | |
| 6,687,487 B1 * | 2/2004 | Mosebrook | H04B 1/74 455/11.1 |
| 7,242,150 B2 | 7/2007 | DeJonge et al. | |
| 7,270,436 B2 | 9/2007 | Jasper | |
| 7,362,285 B2 | 4/2008 | Webb et al. | |
| 7,391,939 B1 | 6/2008 | Williams | |
| 7,546,473 B2 | 6/2009 | Newman et al. | |
| 7,683,279 B2 | 3/2010 | Kim | |
| 7,796,057 B2 | 9/2010 | Swatsky et al. | |
| 8,009,042 B2 | 8/2011 | Steiner et al. | |
| 8,077,058 B2 | 12/2011 | Swatsky et al. | |
| 8,199,010 B2 | 6/2012 | Sloan et al. | |
| 8,228,184 B2 | 7/2012 | Blakeley et al. | |
| 8,330,638 B2 | 12/2012 | Altonen et al. | |
| 8,410,706 B2 | 4/2013 | Steiner et al. | |
| 8,451,116 B2 | 5/2013 | Steiner et al. | |
| 8,664,881 B2 | 3/2014 | Newman et al. | |
| 2002/0141174 A1 * | 10/2002 | Parker | A61M 21/02 362/612 |
| 2005/0073826 A1 | 4/2005 | Kuo | |
| 2006/0090384 A1 * | 5/2006 | Woodruff | G09F 7/12 40/544 |
| 2006/0232725 A1 * | 10/2006 | Chua | B82Y 10/00 349/71 |
| 2007/0147091 A1 * | 6/2007 | Ma | G02B 6/0088 362/633 |
| 2008/0111491 A1 | 5/2008 | Spira et al. | |
| 2008/0260328 A1 * | 10/2008 | Epstein | G02B 6/0018 385/32 |
| 2009/0206983 A1 | 8/2009 | Knode et al. | |
| 2010/0073911 A1 * | 3/2010 | Ohkawa | G02B 6/0016 362/97.1 |
| 2012/0261078 A1 | 10/2012 | Adams et al. | |
| 2012/0286940 A1 | 11/2012 | Carmen et al. | |
| 2013/0030589 A1 | 1/2013 | Pessina et al. | |
| 2013/0214609 A1 | 8/2013 | Carmen et al. | |
| 2013/0335966 A1 * | 12/2013 | Yokota | F21V 3/02 362/235 |
| 2014/0132475 A1 | 5/2014 | Bhutani et al. | |
| 2014/0231032 A1 | 8/2014 | Blair et al. | |
| 2014/0265568 A1 | 9/2014 | Crafts et al. | |
| 2014/0268628 A1 * | 9/2014 | Mann | G08C 17/00 362/23.1 |
| 2015/0179366 A1 | 6/2015 | Kirita | |
| 2015/0346702 A1 | 12/2015 | Camden et al. | |
| 2015/0349402 A1 | 12/2015 | Camden et al. | |
| 2015/0349427 A1 | 12/2015 | Camden et al. | |
| 2015/0349973 A1 | 12/2015 | Camden et al. | |
| 2015/0362668 A1 * | 12/2015 | McDonald | H05B 47/19 362/555 |
| 2016/0034772 A1 * | 2/2016 | Betensky | G06K 9/0004 382/124 |
| 2016/0035217 A1 * | 2/2016 | Camden | H04L 12/2816 340/12.5 |
| 2017/0052306 A1 * | 2/2017 | Koike | G02B 6/0051 |
| 2017/0293068 A1 * | 10/2017 | Li | G02B 6/0036 |

\* cited by examiner

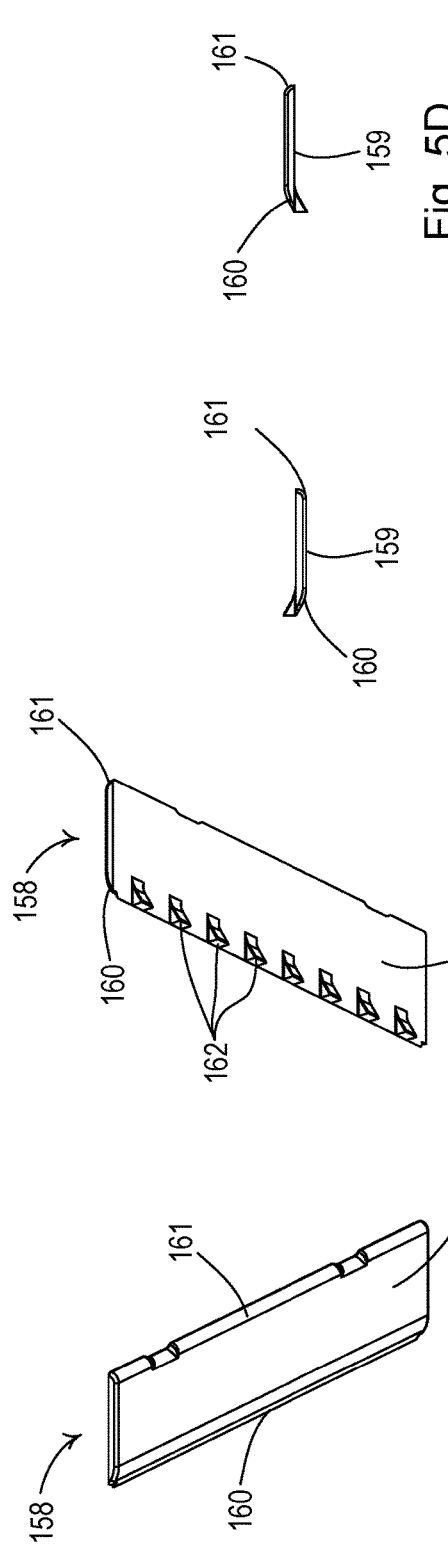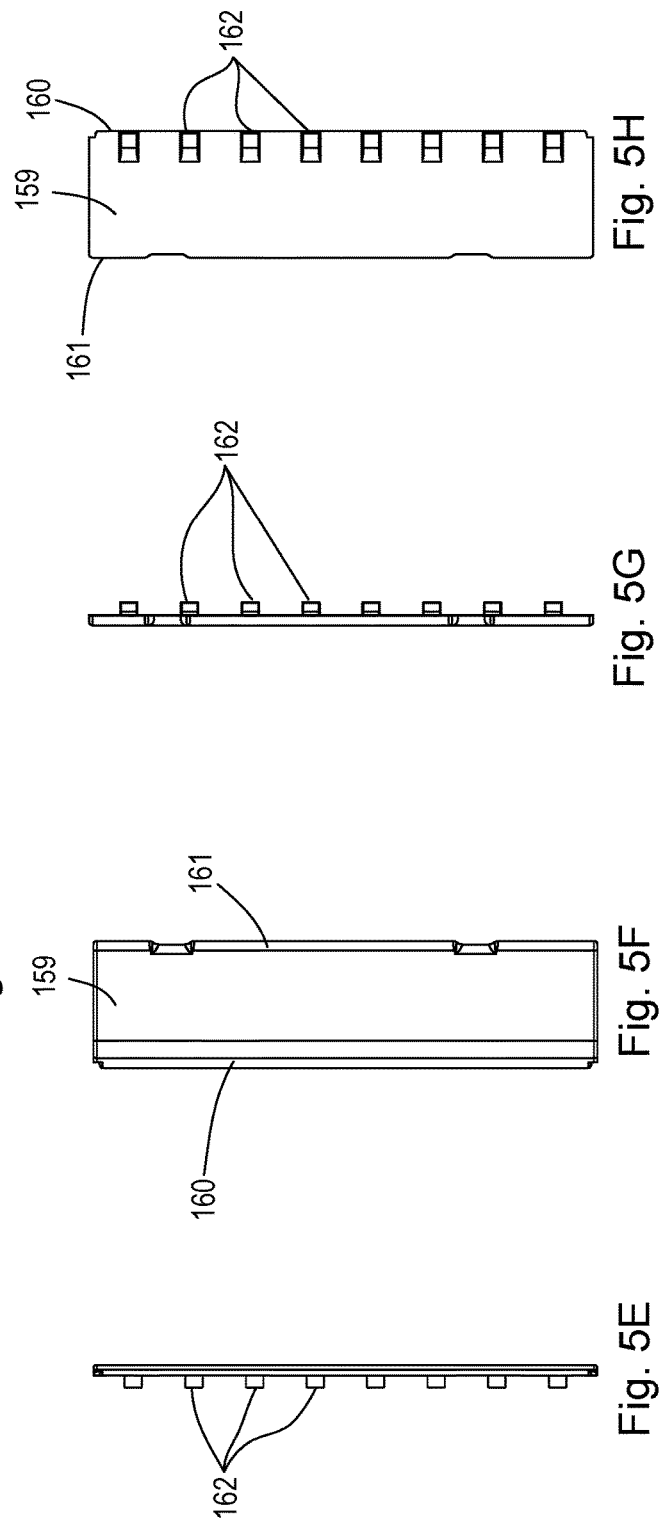

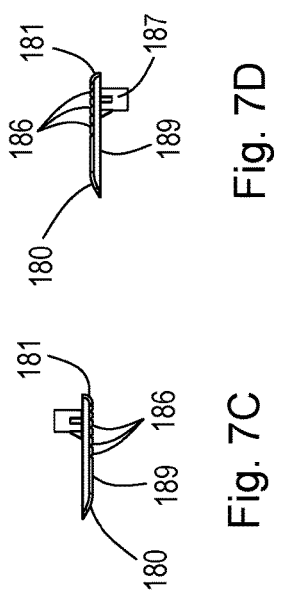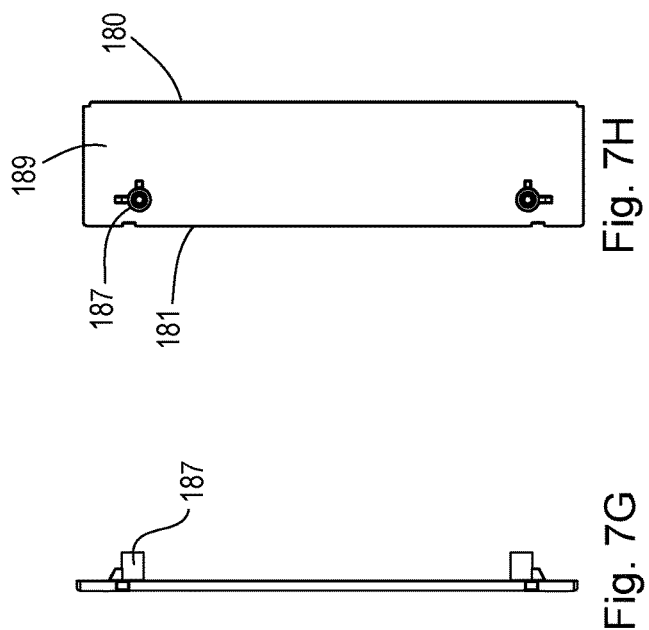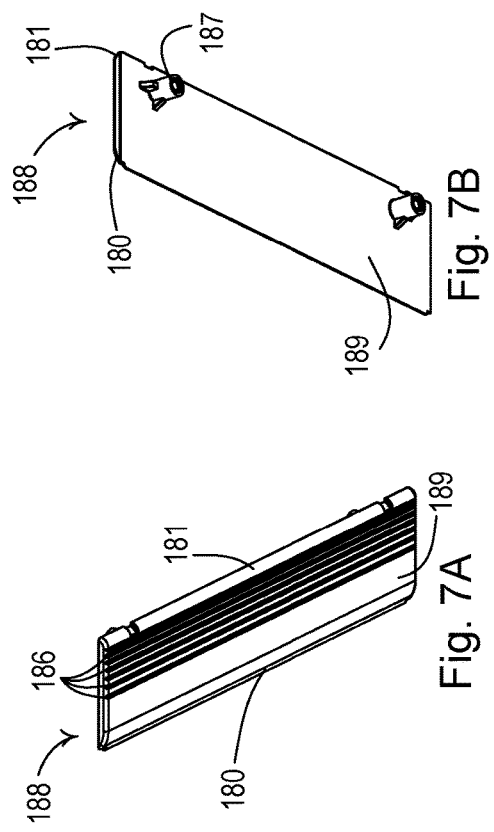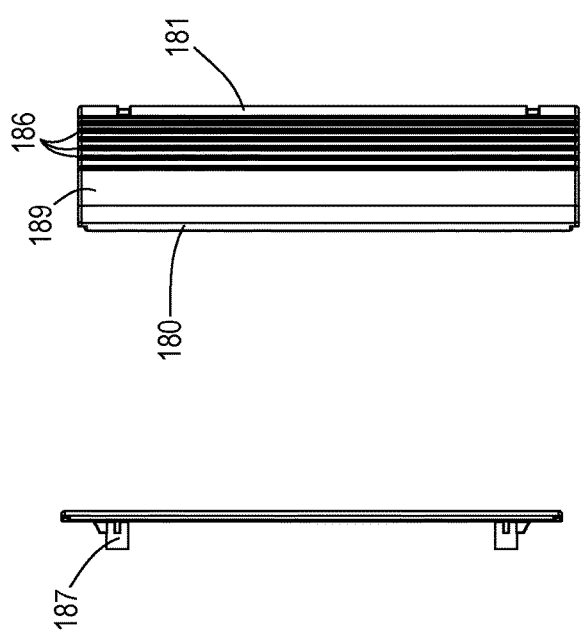

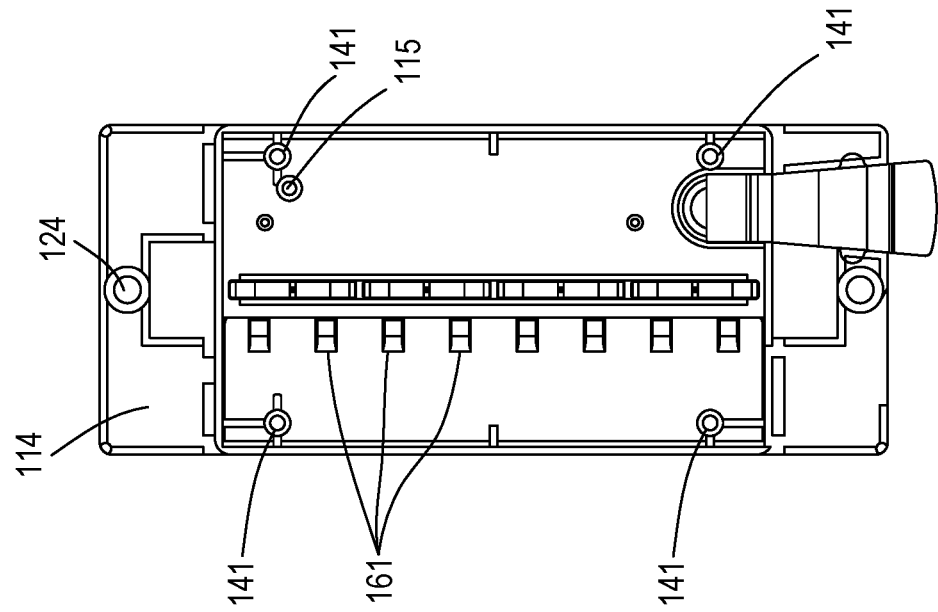
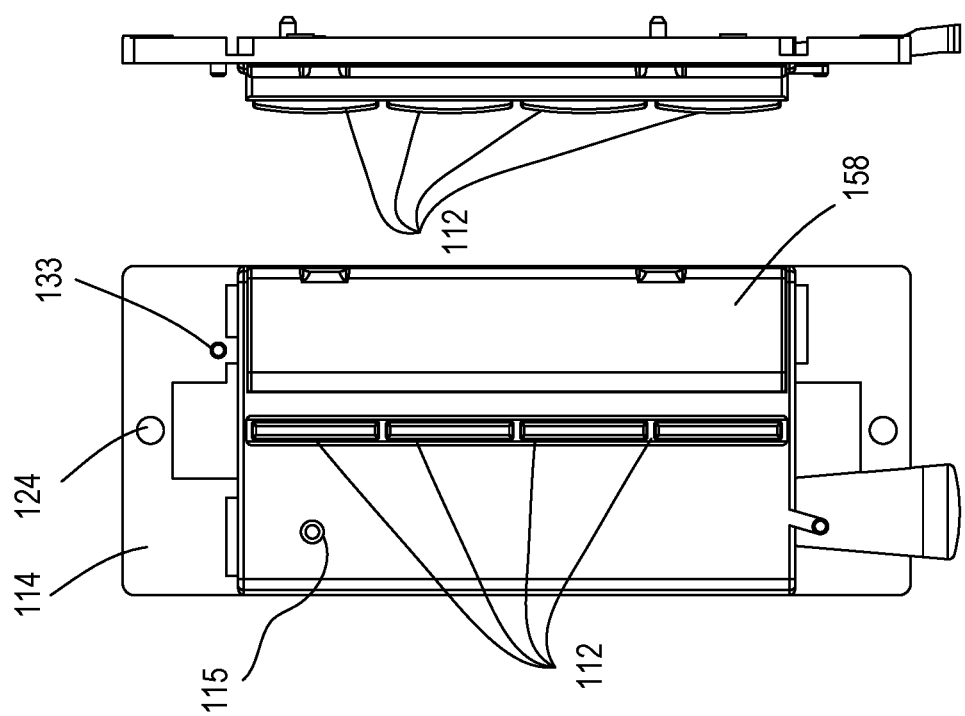
Fig. 11A  Fig. 11B  Fig. 11C

WIRELESS CONTROL DEVICE HAVING A FACEPLATE WITH ILLUMINATED INDICIA

CROSS-REFERENCE TO RELATED APPLICATIONS

This application claims the benefit of Provisional U.S. Patent Application No. 62/239,741, filed Oct. 9, 2015, the disclosure of which is incorporated herein by reference in its entirety.

BACKGROUND

Home automation systems, which have become increasing popular, may be used by homeowners to integrate and control multiple electrical and/or electronic devices in their house. For example, a homeowner may connect appliances, lights, blinds, thermostats, cable or satellite boxes, security systems, telecommunication systems, or the like to each other via a wireless network. The homeowner may control these devices using a controller or user interface provided via a phone, a tablet, a computer, and the like directly connected to the network or remotely connected via the Internet. These devices may communicate with each other and the controller to, for example, improve their efficiency, their convenience, and/or their usability.

A wall-mounted load control device may be adapted to be mounted in a standard electrical wallbox. For example, a wall-mounted dimmer switch may be coupled in series electrical connection between an alternating-current (AC) power source and an electrical load (e.g., a lighting load) for controlling the power delivered from the AC power source to the lighting load and thus the intensity of the lighting load. Many prior art wall-mounted load control devices are capable of transmitting and/or receiving wireless signals (e.g., radio-frequency (RF) signals) with other control devices in a load control system. For example, a wireless load control device may be configured to receive digital messages via the RF signals for controlling the electrical load and to transmit digital messages including feedback information regarding the status of the load control device and/or the electrical load. Such wall-mounted wireless load control devices have included antennas for transmitting and/or receiving the RF signals. Examples of antennas for prior-art wall-mounted load control devices are described in commonly-assigned U.S. Pat. No. 5,982,103, issued Nov. 9, 1999, and U.S. Pat. No. 7,362,285, issued Apr. 22, 2008, both entitled COMPACT RADIO FREQUENCY TRANSMITTING AND RECEIVING ANTENNA AND CONTROL DEVICE EMPLOYING SAME, the entire disclosures of which are hereby incorporated by reference.

Load control devices may have actuation members that provide a user interface for controlling the load. It may further be desirable to have indicia on the load control device to indicate the function of each of the actuation members. The indicia may be backlit for aesthetic purposes. Traditional methods of backlighting using light-emitting diodes (LEDs) are much more cost-effective than panel displays. However, LEDs are discrete point sources, which may cause hotspots and other undesirable non-uniformities of the illumination of the indicia. Additionally, design constraints such as the size of the housing and other internal structures, such as antennas, for example, may interfere with achieving uniform backlighting of the indicia. Accordingly, there is a need for a control device having a light-pipe for illuminating indicia with discrete point sources that results in uniform backlighting of the indicia and is not inhibited by the mechanical structure of the control device.

SUMMARY

As described herein, a control device may include a planar front surface, a planar printed circuit board (PCB), a structure located between the front surface and the PCB, and one or more LEDs (e.g., side firing LEDs) mounted to the PCB. The planar front surface may include at least one indicia. The planar front surface may be defined by a faceplate that adapted to be mounted to the control device. The faceplate may include a light-conductive body and opaque material provided on a front surface of the faceplate. The indicia may be engraved in the opaque material so as to be illuminated by the light transmitted by the light-guiding component to the front surface of the control device. The structure may include one or more openings configured to be substantially aligned with the one or more LEDs (e.g., side firing LEDs), and the one or more protrusions may extend through the one or more openings of the structure. The structure may be painted a reflective color.

The control device may also include a light-guiding component. The light-guiding component may include a planar portion and a curved portion. The planar portion may be located between the front surface and the structure. The curved portion may extend between the LEDs on the PCB and the planar portion to transmit light generated by the LEDs to the front surface of the control device to illuminate the indicia. The planar portion of the light-guiding component may include a distal end opposite the curved portion. The distal end may be configured to illuminate the front surface beyond the distal end. The indicia may be configured to extend from a first position on the front surface adjacent the curved portion to a second position on the front surface beyond the distal end of the light-guiding component, where the distal end of the light-guiding component may be configured to illuminate the indicia located beyond the distal end of the light-guiding component. The light-guiding component may include a plurality of ridges on a top surface of the light-guiding component. The plurality of ridges may be configured to disperse light generated by the one or more LEDs towards the front surface of the control device with substantial uniformity. The light-guiding component may include a dot pattern printed on a rear surface of the light-guiding component. The dot pattern may include a plurality of dots configured to disperse light generated by the one or more LEDs (e.g., side firing LEDs) towards the front surface of the control device with substantial uniformity.

The indicia may include a plurality of indicia arranged within a first area on the front surface, and the planar portion of the light-guiding component may define a second area. The light-guiding component may be arranged such that an orthogonal projection of the second area onto the first area of the front surface is encompassed by the first area. The distal end of the light-guiding component may be curved or beveled to illuminate the front surface beyond the distal end. The curved portion of the light-guiding component may include a rear curved surface configured to reflect light emitted by the LEDs towards the front surface of the control device. The front curved surface of the light-guiding component may be configured to reflect light away from the front surface and towards the planar portion of the light-guiding component. The curved portion of the light-guiding component may include one or more protrusions extending from a rear surface of the light-guiding component and substantially aligned with the one or more side-firing LEDs mounted to the printed circuit board.

The structure may include an antenna configured to transmit or receive radio frequency signals. The antenna may include a planar driven element located between the light-guiding component and the PCB. The structure may include a radio-frequency communication circuit mounted to the printed circuit board and configured to transmit or receive the radio frequency signals via the antenna.

A wall-mountable wireless control device may include a yoke, a user interface, a bezel, one or more LEDs (e.g., side firing LEDs), and a light-guiding component. The yoke may be configured to mount the wireless control device to an electrical wallbox. The user interface may be configured to receive a user input. The bezel may be configured to be attached to the yoke, and the user interface may be provided through the bezel. The one or more LEDs may be mounted on a printed circuit board (PCB). The light-guiding component may be configured to control the transmission of light generated by the one or more LEDs. The light-guiding component may include a curved end portion and a plurality of ridges on a surface of the light-guiding component. The control device may also include an antenna, a radio-frequency communication circuit, and a control circuit. The antenna may be configured to transmit or receive radio frequency signals. The antenna may include a driven element configured to be located between the light-guiding component and the PCB. The radio-frequency communication circuit may be configured to transmit or receive the radio frequency signals via the antenna. The control circuit may be responsive to the user input and the radio-frequency communication circuit.

The light-guiding component may include a beveled or curved end portion. The light-guiding component may be configured to be attached to the front surface of the bezel. The light-guiding component may include one or more protrusions on the back surface of the light-guiding component. The one or more LEDs may be configured to be substantially aligned with the one or more protrusions when the light-guiding component is installed in the wireless control device. The plurality of ridges may be configured to disperse light generated by the one or more LEDs with substantial uniformity.

The wireless control device may include a faceplate configured to receive the user interface. The faceplate may include a light-conductive body, and the light-guiding component may be configured to be located between the faceplate and the driven element. The driven element may include one or more openings configured to be substantially aligned with the one or more LEDs. The driven element may include one or more openings configured to be substantially aligned with the one or more protrusions of the light-guiding component. The one or more protrusions of the light-guiding component may be configured to extend through the one or more openings of the driven element.

A control device may include a removable faceplate, a planar printed circuit board, a structure located between the faceplate and the printed circuit board, one or more LEDs (e.g., side firing LEDs) mounted to the printed circuit board, and a light-guiding component. The removable faceplate may be configured to be mounted to the control device. The faceplate may include a light-conductive body and an opaque material provided on a front surface of the faceplate. At least one indicia may be engraved in the opaque material. The light-guiding component may include a planar portion and a curved portion. The planar portion may be located between the faceplate and the structure. The curved portion may extend between the LEDs on the printed circuit board and the planar portion to transmit light generated by the LEDs to the faceplate to illuminate the indicia.

BRIEF DESCRIPTION OF THE DRAWINGS

FIG. 5A is a perspective front view of an example light-guiding component.

FIG. 5B is a perspective rear view of the example light-guiding component of FIG. 5A.

FIG. 5C is a top view of the example light-guiding component of FIG. 5A.

FIG. 5D is a bottom view of the example light-guiding component of FIG. 5A.

FIG. 5E is a left side view of the example light-guiding component of FIG. 5A.

FIG. 5F is a front view of the example light-guiding component of FIG. 5A.

FIG. 5G is a right side view of the example light-guiding component of FIG. 5A.

FIG. 5H is a rear view of the example light-guiding component of FIG. 5A.

FIG. 7A is a perspective front view of another example light-guiding component.

FIG. 7B is a perspective rear view of the example light-guiding component of FIG. 7A.

FIG. 7C is a top view of the example light-guiding component of FIG. 7A.

FIG. 7D is a bottom view of the example light-guiding component of FIG. 7A.

FIG. 7E is a left side view of the example light-guiding component of FIG. 7A.

FIG. 7F is a front view of the example light-guiding component of FIG. 7A.

FIG. 7G is a right side view of the example light-guiding component of FIG. 7A.

FIG. 7H is a rear view of the example light-guiding component of FIG. 7A.

FIG. 11A is a front view of the bezel of FIG. 10.

FIG. 11B is a side view of the bezel of FIG. 10.

FIG. 11C is a rear view of the bezel of FIG. 10.

DETAILED DESCRIPTION

Figure 1:
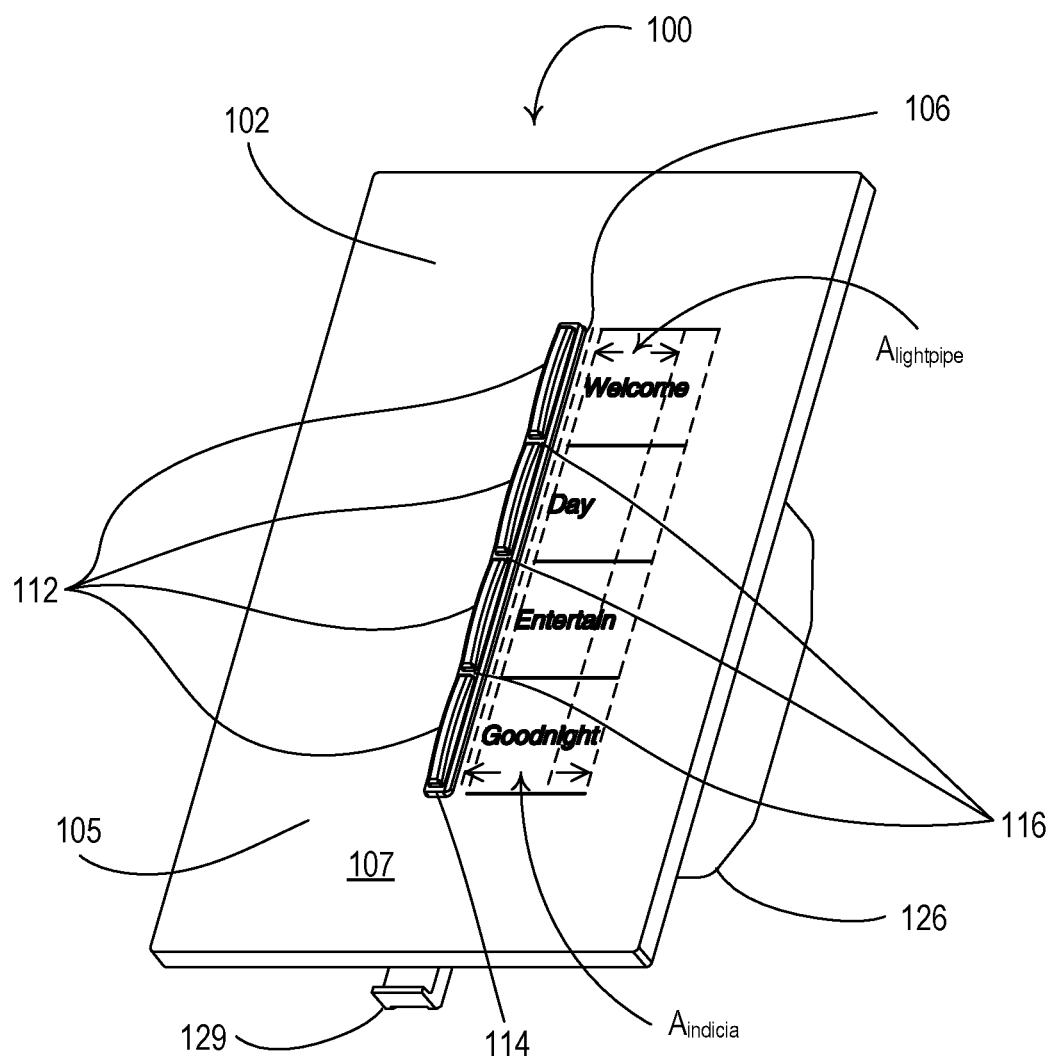
FIG. 1 is a perspective view of an example load control device, with a plurality of actuation members installed.
Figure 2:
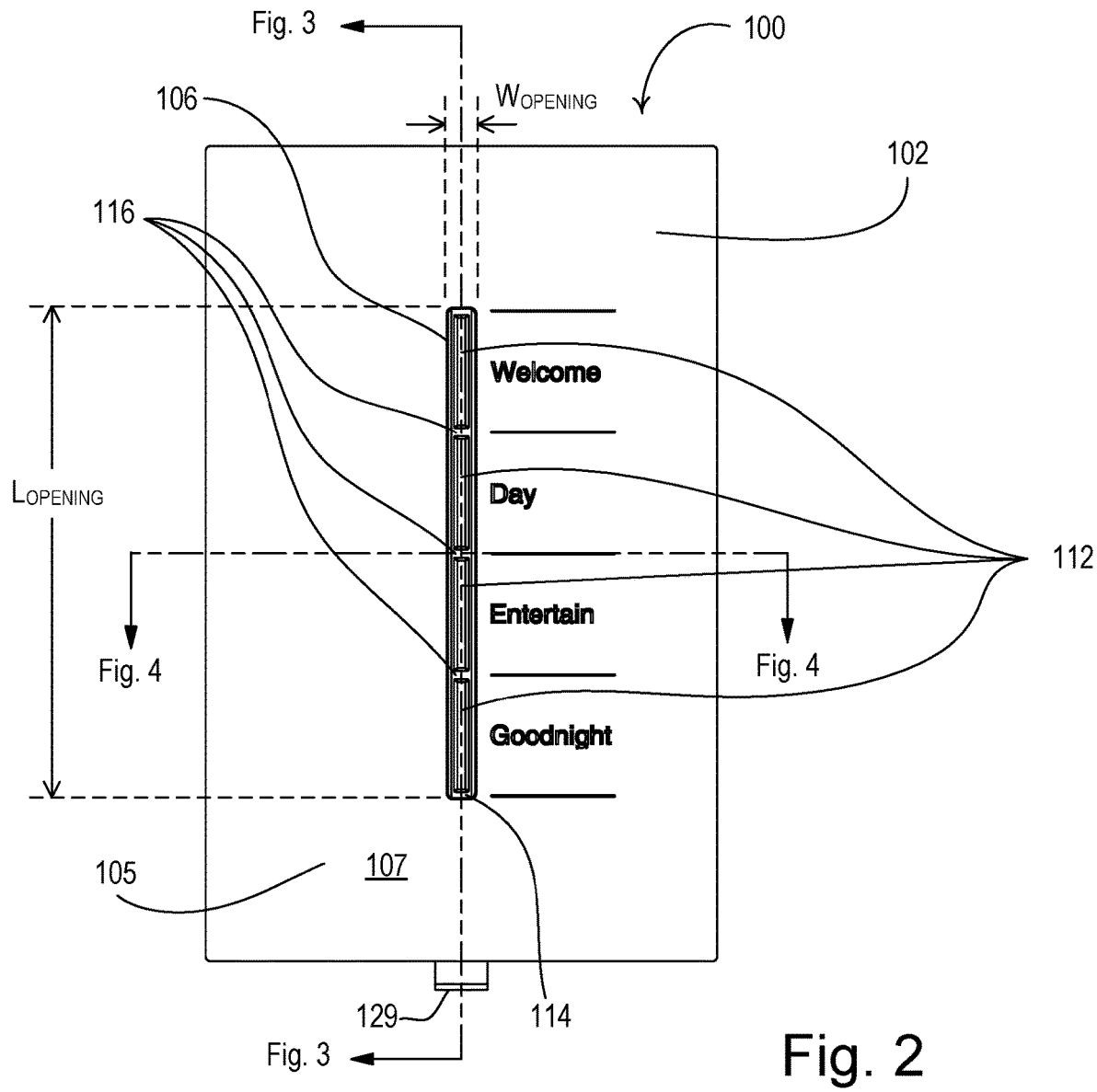
FIG. 2 is a front view of the load control device of FIG. 1.
Figure 3:
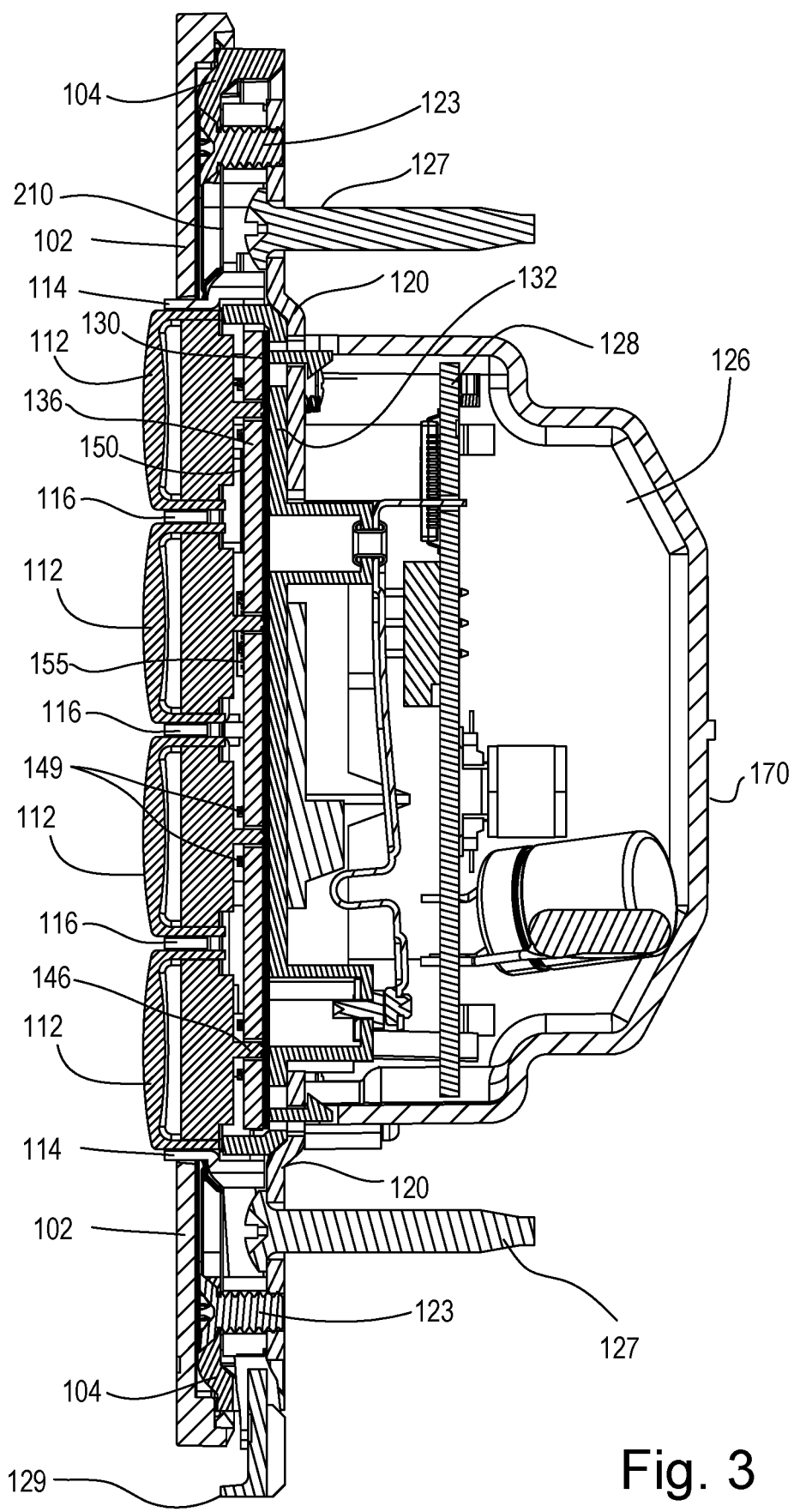
FIG. 3 is a right side cross-sectional view of the load control device of FIG. 1, taken through the center of the load control device as shown in FIG. 2.
Figure 4A:
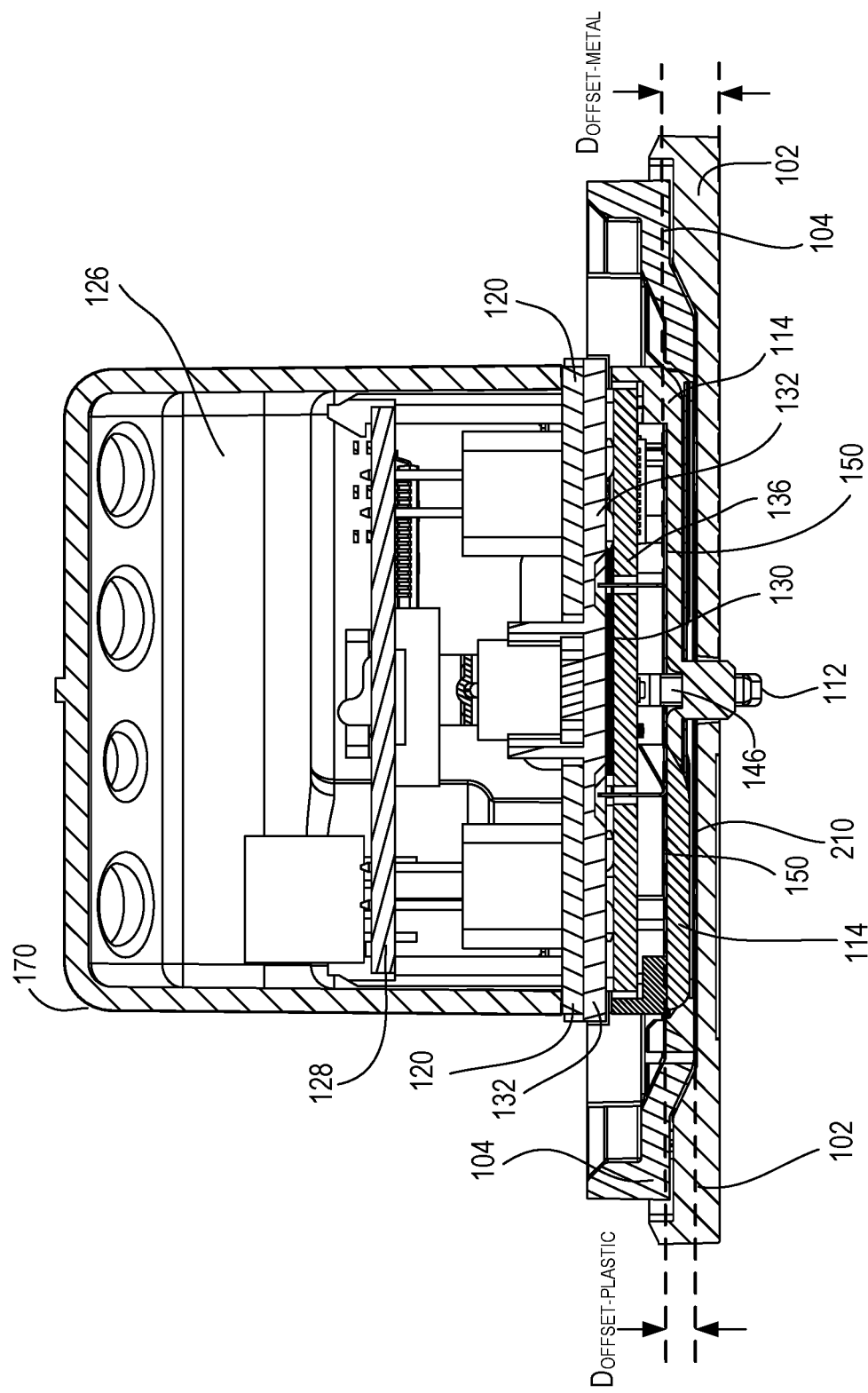
FIG. 4A is a first top side cross-sectional view of the load control device of FIG. 1, taken through the center of the load control device as shown in FIG. 2.
Figure 4B:
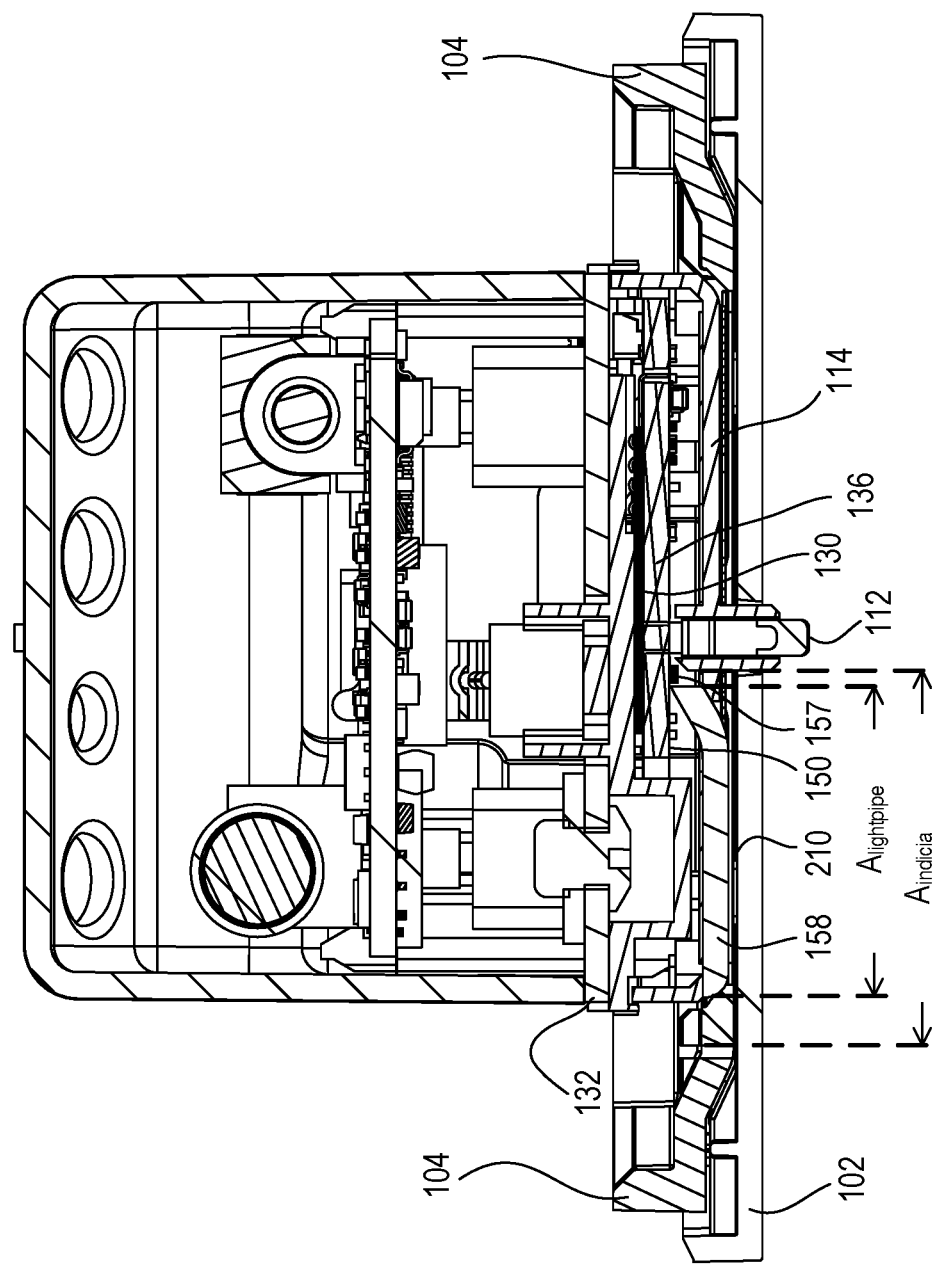
FIG. 4B is a second top side cross-sectional view of the load control device of FIG. 1, taken through the center of the load control device as shown in FIG. 2.

FIG. 1 is a perspective view of an example load control device 100. FIG. 2 is a front view of the load control device 100. FIG. 3 is a right side cross-sectional view of the load control device 100 taken through the center of the wireless control device as shown in FIG. 2. FIG. 4A is a first top side cross-sectional view of the load control device 100 taken through the center of the load control device as shown in FIG. 2. FIG. 4B is a second top side cross-sectional view of the load control device 100 taken through the center of the load control device as shown in FIG. 2.

Figure 6:
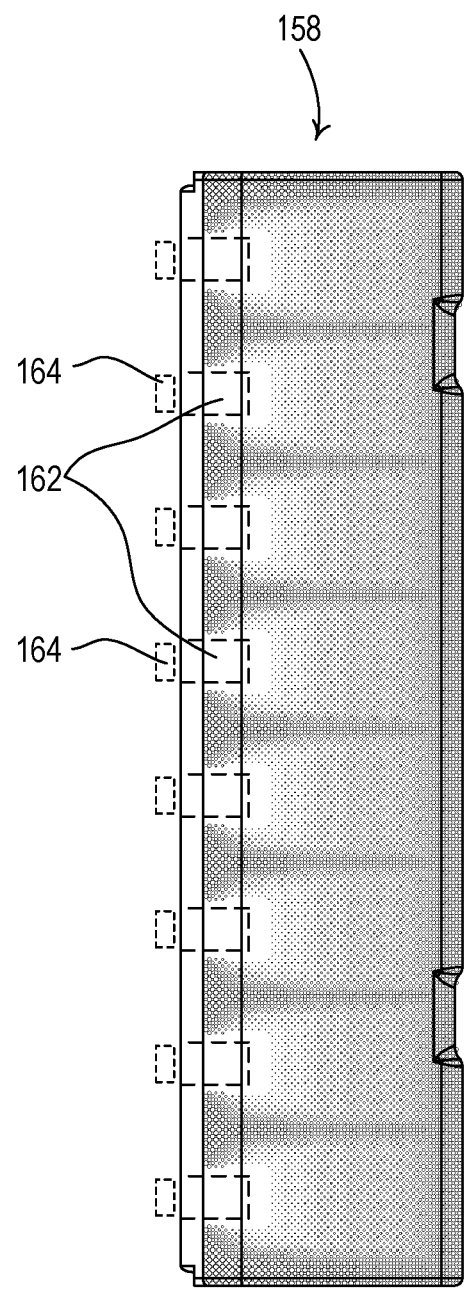
FIG. 6 is a front view of the example light-guiding component of FIG. 5A showing an example dot pattern.

FIG. 5A is a perspective front view of an example light-guiding component 158. FIG. 5B is a perspective rear view of the example light-guiding component 158. FIG. 5C is a top view of the example light-guiding component 158. FIG. 5D is a bottom view of the example light-guiding component 158. FIG. 5E is a left side view of the example light-guiding component 158. FIG. 5F is a front view of the example light-guiding component 158. FIG. 5G is a right side view of the example light-guiding component 158. FIG. 5H is a rear view of the example light-guiding component 158. FIG. 6 is a front view of the example light-guiding component 158 with an example dot pattern. FIG. 7A is a perspective front view of an example light-guiding component 188. FIG. 7B is a perspective rear view of the example light-guiding component 188 of FIG. 7A. FIG. 7C is a top view of the example light-guiding component 188 of FIG. 7A. FIG. 7D is a bottom view of the example light-guiding component 188 of FIG. 7A. FIG. 7E is a left side view of the example light-guiding component 188 of FIG. 7A. FIG. 7F is a front view of the example light-guiding component 188 of FIG. 7A. FIG. 7G is a right side view of the example light-guiding component 188 of FIG. 7A. FIG. 7H is a rear view of the example light-guiding component 188 of FIG. 7A.

Figure 8:
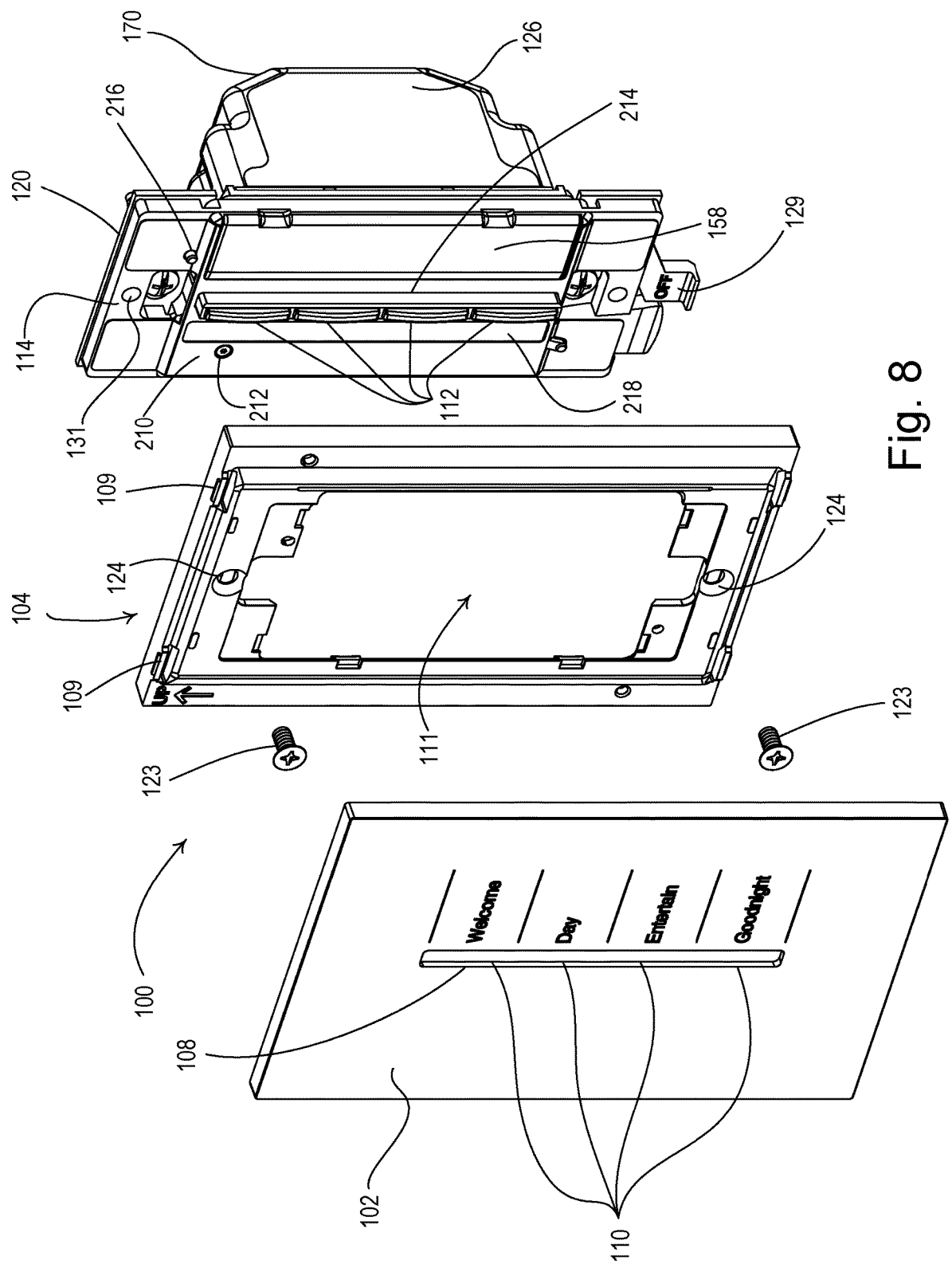
FIG. 8 is a partial exploded view of the load control device of FIG. 1 showing a faceplate and an adapter plate removed from the load control device.
Figure 9:
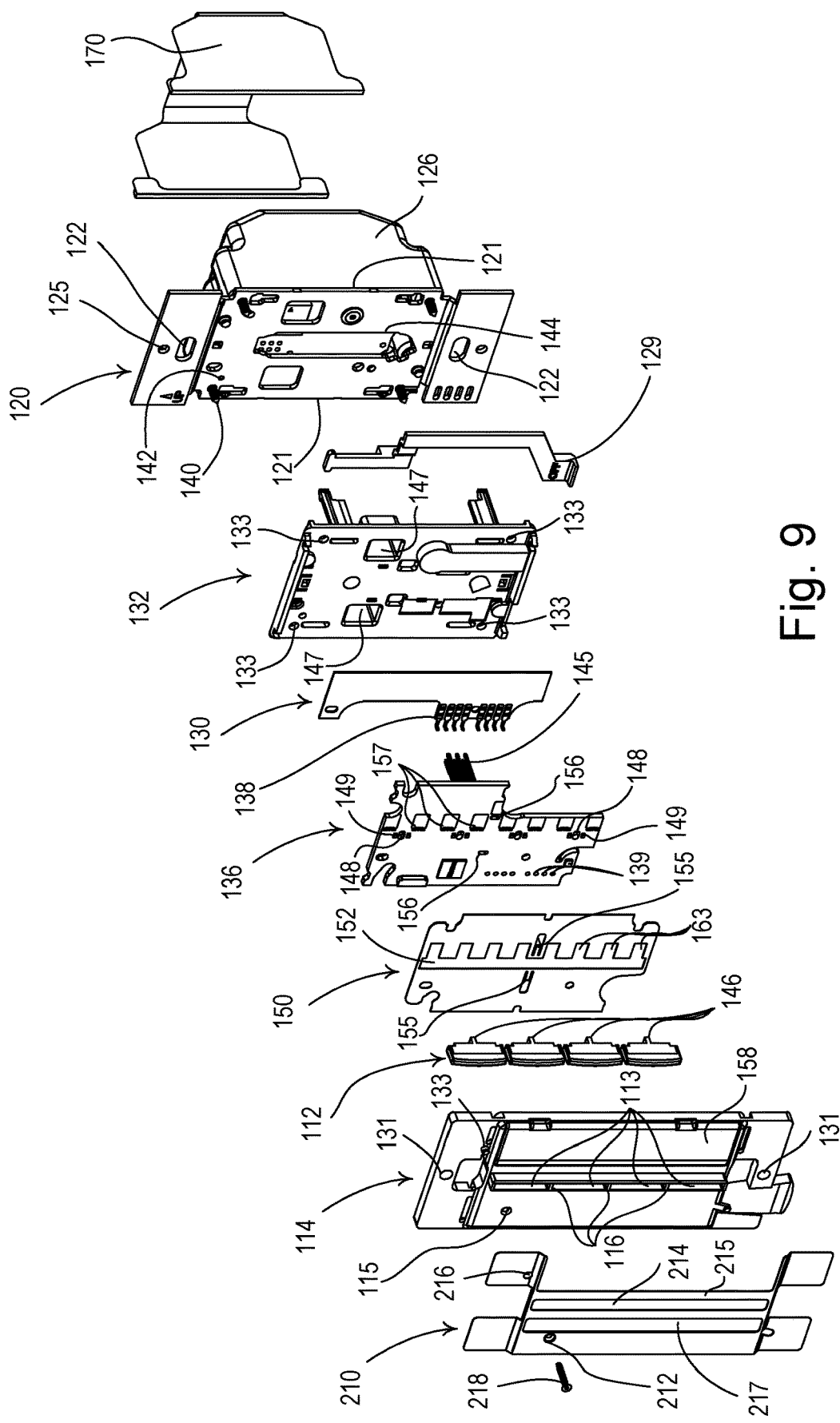
FIG. 9 is an exploded view of the load control device of FIG. 1 showing a portion of an antenna of the load control device.
Figure 10:
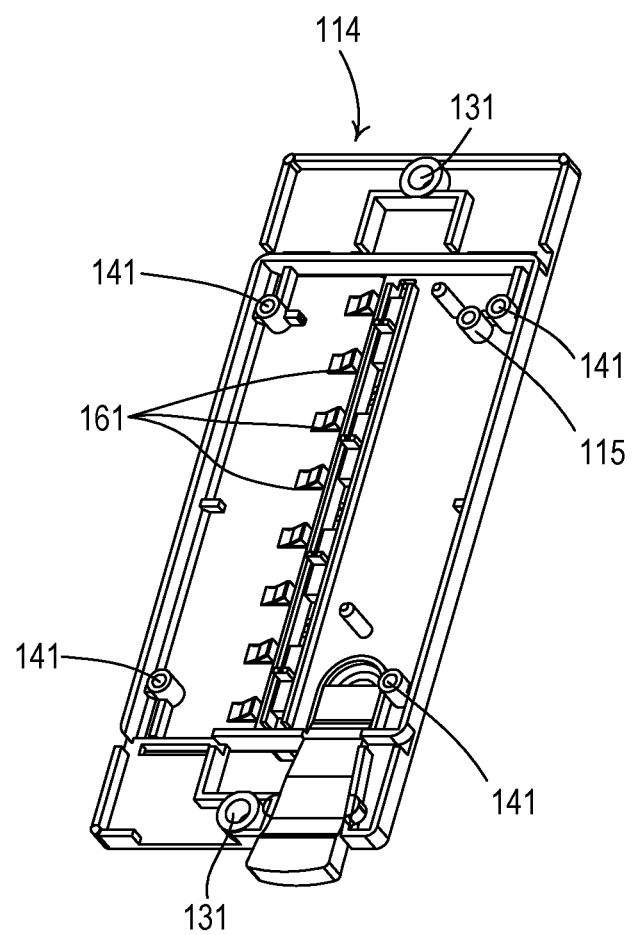
FIG. 10 is a rear perspective view of an example bezel of the load control device of FIG. 1.

FIG. 8 is a partial exploded view of the load control device 100 showing a faceplate 102 and an adapter plate 104 removed from the load control device. FIG. 9 is an exploded view of the load control device 100 showing a portion of an antenna of the load control device. FIG. 10 is a rear perspective view of a bezel 114. FIG. 11A is a front view and FIG. 11B is a side view of the bezel 114, with the plurality of actuation members 112 installed. FIG. 11C is a rear view of the bezel 114, with the plurality of actuation members 112 installed.

Figure 15:
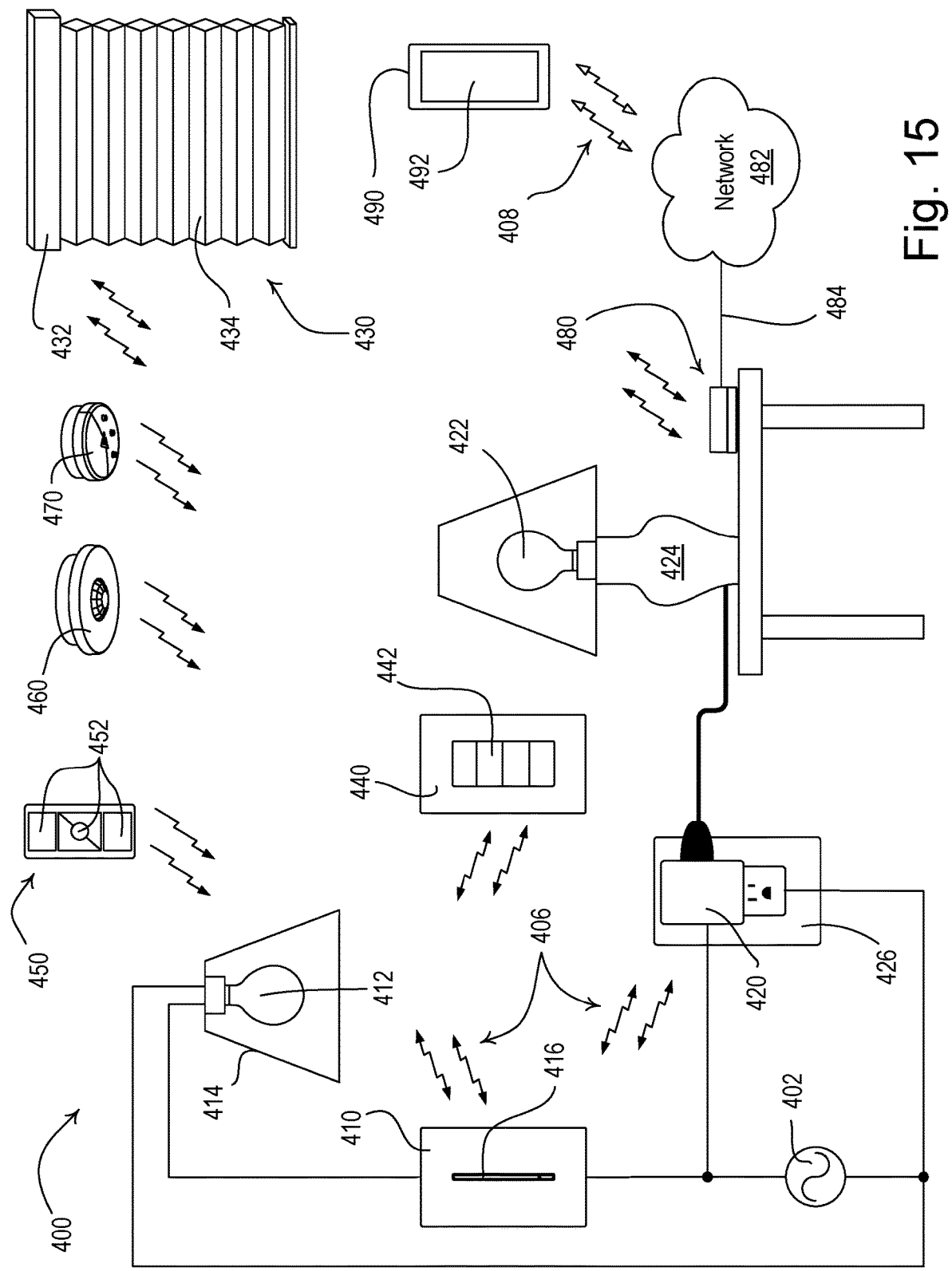
FIG. 15 is a simple diagram of an example load control system.

The example load control device 100 may be configured to operate as a wall-mounted remote control device of a load control system (e.g., the load control system 400 shown in FIG. 15). The example load control device 100 may include one or more actuation members 112 that allow for control of one or more electrical loads (e.g., lighting loads). The one or more actuation members 112 may be provided as a keypad.

The load control device 100 may be used for controlling the power delivered from an alternating-current (AC) source to the electrical loads.

The load control device 100 may comprise a faceplate 102, an air-gap actuator 129, and an enclosure 126. The faceplate 102 may define a planar front surface of the load control device 100 and may have an opening 106 for receiving the bezel 114 and one or more actuation members 112 that are configured to receive user inputs. The opening 106 may be adapted to receive the one or more actuation members 112, for example, when the faceplate 102 is installed on the wireless control device 100. The one or more actuation members 112 may be arranged along a longitudinal axis of the load control device 100. The opening 106 may have a length $L_{OPENING}$. The opening may have a width $W_{OPENING}$. The opening 106 may have an aspect ratio (e.g., $L_{OPENING}:W_{OPENING}$) of, for example, approximately 16:1. For example, the length $L_{OPENING}$ may be approximately 2.83 inches and the width $W_{OPENING}$ may be approximately 0.17 inch.

The faceplate 102 may comprise a light-conductive body portion 105 and opaque material provided on a front surface 107 of the faceplate. Indicia (e.g., text and/or graphics) may be engraved in the opaque material and be illuminated by one or more light sources, for example, as described herein. The one or more actuation members 112 may be buttons and may be made of a non-conductive material, such as plastic or glass, or of a conductive material, such as a metallic sheet attached to a plastic carrier. The one or more actuation members 112 may each be designated to actuate one or more operational settings (e.g., presets, scenes, and/or predetermined light intensities) associated with a specific use scenario, such as "Welcome," "Day," "Entertain," or "Goodnight." An operational setting may refer to predetermined and/or configurable operational parameters of one or more electrical loads, for example, light intensity, HVAC setting (e.g., temperature), window treatment setting, and/or the like. The specific use scenario associated with each of the actuation members 112 may be indicated, for example, by placing labels next to the actuation members 112 describing their associated use scenarios, such as "Welcome," "Day," "Entertain," or "Goodnight." The load control device 100 may be configured to transmit RF signals in response to actuations of the actuation members 112 to apply the corresponding operational settings.

The load control device 100 may include a bezel 114. The bezel 114 may be shaped to form one or more openings 113 separated by one or more dividers 116, through which the front surface of the one or more actuation members 112 or different portions of an actuation member (e.g., when an actuation member has an upper portion and a lower portion) may extend. The load control device 100 may include a yoke 120. The yoke 120 may be used to mount the load control device 100 to a standard electrical wallbox, for example, via mounting screws 127 that may be received through two mounting holes 122. The yoke 120 may be made from a conductive material. The faceplate 102 may be mounted (e.g., snapped) to an adapter plate 104, for example, such that the bezel 114 is housed behind the faceplate 102 and may extend through an opening 111 in the adapter plate 104. The mounting may be realized by having, for example, tabs (not shown) on the top and bottom sides of the faceplate 102 that may be adapted to snap to tabs 109 on the top and bottom edges of the adapter plate 104. The adapter plate 104 may connect to the yoke 120 of the load control device 100 via, for example, faceplate screws 123 that may be received through the openings 124 in the adapter plate 104, openings 131 in the bezel 114, and corresponding openings 125 in the yoke 120.

The load control device 100 may include an enclosure 126. The enclosure 126 may house a rear printed circuit board (PCB) 128, on which a portion of the electrical circuitry of the load control device 100 may be mounted. The load control device 100 may include a non-conductive cradle 132. The cradle 132 may be shaped to hold a touch sensitive device 130. The touch sensitive device 130 may be electrically coupled to a front printed circuit board (PCB) 136, for example, via connector pins 138 that may be received in through-holes 139 in the front PCB 136. The bezel 114 may attach to the yoke 120, for example, such that the cradle 132 and the front PCB 136 are positioned (e.g., captured) between the bezel 114 and the yoke 120. For example, the bezel 114, the cradle 133 and the yoke 120 may be connected by screws 140 that may be received through openings 141 in the bezel 114, openings 133 in the cradle 132 and corresponding openings (not shown) in the yoke 120.

The air-gap actuator 129 may be positioned between the cradle 132 and the yoke 120 and be configured to actuate an internal air-gap switch inside of the enclosure 126 through a central opening 144 in the yoke 120. The air-gap switch actuator 129 may be configured to translate along the longitudinal axis of the load control device 100 to open and close the internal air-gap switch. The internal air-gap switch may be coupled in series with a controllably conductive device of the load control device 100. The air-gap switch may be opened and closed in response to actuations of the air-gap switch actuator 129. When the air-gap switch is closed, the controllably conductive device is operable to conduct current to the load. When the air-gap switch is open, the electrical load 304 is disconnected from the AC power source. The front PCB 136 may be connected to the rear PCB 128, for example, via one or more electrical connectors 145 that may extend through openings 147 in the cradle 132.

The actuation members 112 may be positioned (e.g., captured) between the bezel 114 and the touch sensitive device 130. This way, the front surface of the actuation members 112 may extend through the opening 113 in the bezel 114 in the forward direction and contact the front surface of the touch sensitive device 130 in the backward direction. The actuation members 112 may each include one or more actuation posts 146 for contacting the touch sensitive device 130. The actuation posts 146 may act as force concentrators to concentrate the force from an actuation of the front surface of the actuation members 112 to the touch sensitive device 130. The front PCB 136 may be substantially planar and may be shaped to form holes 148. The actuation posts 146 may extend through the holes 148 in the front PCB 136 to contact the touch sensitive device 130. The load control device 100 may be operable to, for example, control the intensity of the controlled lighting load in response to actuations of the actuation members 112 and/or the touch sensitive device 130.

The front PCB 136 may include visual indicators, for example, light-emitting diodes (LEDs) 149. The LEDs 149 may be positioned, for example, adjacent to the rear surface of the actuation members 112. The actuation members 112 may be substantially transparent, for example, such that the LEDs 149 are operable to illuminate the front surface of the actuation members 112. Inputs from the actuation members 112 may be received by a control circuit (e.g., the control circuit 314). The control circuit may individually control the LEDs 149 in response to the inputs to illuminate the LEDs 149 behind the actuation member from which the inputs are received. In one or more examples, the LEDs 149 may all have the same color (e.g., white). In one or more examples, different color LEDs 149 may be placed behind the actuator members 112 designated for different purposes. For example, the actuation member designated for "Welcome" may be illuminated with orange light while that for "Goodnight" may be illuminated with blue light.

The load control device 100 may comprise a light source 157 and a light-guiding component 158 (e.g., a light-pipe) configured to control the transmission of light from the light source 157. The light source 157 and the light-guiding component 158 may operate to, for example, uniformly illuminate a certain area of the faceplate 102 (e.g., the area containing the labels for indicating the various use scenarios associated with the actuation members 112). The light source 157 and light-guiding component 158 may be used for other illumination purposes such as highlighting the entire surface of the faceplate 102 or outlining the borders of the faceplate 102 in a dark environment. Although the load control device 100 is illustrated with the inclusion of the light-guiding component 158, the load control device 100 may use other light-guiding components, such as the light-guiding component 188 of FIG. 7A-H.

The light source 157 may include, for example, one or more LEDs (e.g., side firing LEDs as shown) and/or one or more LED strips (e.g., side firing LED strips). The number of the LED devices may vary and may not necessarily be related to the number of indicia included on the front surface of the load control device 100. The light source 157 may produce light of a single color or multiple colors. The light source 157 may be provided on the front PCB 136, arranged along the longitudinal axis of the load control device 100, and/or placed on the same side of the longitudinal axis as the target area of the front surface needing illumination.

The light-guiding component 158 may be made of a variety of materials suitable for light transmission, including, for example, polycarbonate plastic and/or glass. When installed in the load control device 100, the light-guiding component 158 may be positioned in front of a structure (e.g., which may include the antenna and RF communication circuit) of the load control device 100 that may itself be located in front of the front PCB 136. For example, the light-guiding component may be placed in front of a driven element of an antenna of the load control device 100 (e.g., such as the antenna described herein), the bezel 114, the conductive component 210, and/or the like. The structure may be painted a reflective color (e.g., white) to direct light towards the front surface of the load control device 100. In one or more examples, the light-guiding component 158 may be attached to the front surface of the bezel 114 in an area substantially aligned with the target illumination area of the faceplate 102. The light-guiding component 158 may be attached to the bezel 114 using various mechanisms such as a two-shot molding process, an insert molding process, a snapping mechanism, and/or the like.

The light-guiding component 158 may have a dimension suitable for installation within the load control device 100 and/or for guiding light towards a target illumination area of the front surface (e.g., the faceplate 102). For example, the light-guiding component 158 may have a thickness fitting for accommodation between the faceplate 102 and the structure described herein; the light-guiding component 158 may also have a substantially planar portion 159, the shape of which conforms to the shape of the faceplate 102 and/or the structure. Further, the light-guiding component 158 may comprise a curved end portion 160 that may extend between the light source 157 (e.g., one or more side firing LEDs on the front PCB 136) and the planar portion 159 of the light-guiding component 158. When one or more LED devices are used as the light source 157, the curved end portion 160 may be aligned with the firing sides of the one or more LED devices, and may operate to guide the light emitted by the LED devices in multiple directions and/or at different angles towards the target illumination area of the faceplate 102. For example, the curved end portion of the light-guiding component may comprise a rear curved surface configured to reflect light emitted by the LEDs towards the front surface of the load control device 100 and a front curved surface configured to reflect light away from the front surface and towards the planar portion of the light-guiding component. As a result, the uniformity of the light transmission may be improved. Problems (e.g., hot and/or dark spots) commonly associated with light transmission in tight space (e.g., such as the limited space occupied by the load control device 100) may also be reduced or eliminated.

The planar portion of the light-guiding component 158 may have a distal end portion 161 that is configured to illuminate the front surface of the load control device 100 beyond the distal end. The distal end 161 may be beveled or curved, and may be on the opposite side of the first curved end portion 160 and across from the light source 157. The distal end portion 161 may operate to direct light from the light source 157 to areas beyond the boundaries of the light-guiding component 158 and thereby increase the illumination range of the light source 157. For example, a faceplate (e.g., faceplate 102) may overlay the light-guiding component 158 when the faceplate is installed on the load control device 100. The faceplate may include indicia (e.g., text and/or graphics) defined and/or underlined by perforations in the faceplate. When the faceplate is installed on the load control device 100, the indicia may be located within an area $A_{indicia}$ (e.g., as shown in FIGS. 1 and 4B) that may have a length substantially equal to the length of the opening 106 of the faceplate 102 and a width at least equal to the width of the text and/or graphics of the indicia. The indicia may extend outside the physical boundaries of the underlying light-guiding component 158, which may be represented by an area $A_{lightpipe}$ (e.g., as shown in FIGS. 1 and 4B). The area $A_{lightpipe}$ may also span the entire length of the opening 106 of the faceplate 102 but with a width shorter than that of the area $A_{indicia}$. As such, the light-guiding component 158 may include a beveled or curved distal end portion 161 that directs light to areas greater than the surface area (e.g., area $A_{lightpipe}$, as shown in FIGS. 1 and 4B) of the light-guiding component 158 to illuminate the indicia of the faceplate. This is because light entering from the first curved end portion 159 may be projected from the beveled (or curved) distal end portion 161 orthogonally or at an obtuse angle towards the faceplate and illuminate an area (e.g., the part of the indicia extending outside of the area $A_{lightpipe}$, as shown in FIGS. 1 and 4B) that is located outside of the area directly overtop the light guiding component 158.

The light-guiding component 158 may further comprise a plurality of protrusions 162. The protrusions 162 may be placed on the rear surface of the light-guiding component 158 and/or along the curved end portion 160. The size of the protrusions 162 may vary based on, for example, the dimension of the light source 157 and the amount of space available for the installation of the light-guiding component 158. The number of the protrusions 162 may also vary. For example, when one or more LEDs (e.g., side firing LEDs) are used as the light source 157, the number of the protrusions 162 may be equal to the number of the LEDs and the protrusions 159 may be substantially aligned with the positions 164 of the LEDs. Each of the protrusions 162 may have a flat vertical surface facing the LEDs and receiving light from the LEDs. Each protrusion 162 may also have an inclined plane extending from the top of the flat vertical surface to the opposite end of the protrusion so that light emitted from the LEDs may be reflected by the protrusions 162 towards the target illumination area of the front surface (e.g., faceplate 102). Although the foregoing functionality is realized through a plurality of protrusions 162, it will be appreciated that other configurations may be also used without substantially affecting the functionality. For example, instead of the plurality of protrusions 162, the light-guiding component 158 may include a long, bar-shaped, single protrusion.

The light-guiding component 158 may further comprise a dot pattern (e.g., the example dot pattern shown in FIG. 6) imposed on a surface of the light-guiding component 158. Even though the term "dot" is used herein, it will be appreciated that the meaning of the term can be broader and may cover any type of geometric shapes such as a triangle, a square, and/or the like (e.g., even a gradient). The dot pattern may be configured to control the transmission of light from the light source 157 onto a target illumination area of the faceplate 102. For example, the dot pattern may be configured to control the amount of light from the light source 157 that can pass through the light-guiding component 158 to reach the target illumination area of the faceplate 102. The dot pattern may be configured to control the distribution of the light from the light source 157 onto the target illumination area of the faceplate 102.

The dot pattern may be configured to affect the deflection of the light from the light source 157. For example, the dot pattern may be printed in white color on the rear surface of the light-guiding component such that light hitting the white dots may be reflected onto the front surface of load control device 100 in the areas above the white dots. The dot pattern may be configured to do one or more of the above to disperse the light from the light source 157 with substantial uniformity to the target area of the faceplate 102. In some examples, the faceplate 102 may comprise a plurality of perforations arranged to form a line below every indicator label (e.g., as shown in FIG. 1). The dot pattern may then be configured to have more dots and/or darker-colored dots along the perforated lines in the faceplate 102 so that those lines do not appear too bright when compared to the rest of the target illumination area. The dot pattern may also be configured to have fewer dots in the areas closer to the light source 157 (e.g., one or more side firing LEDs) and more dots in the areas farther away from the light source 157 so that the entire target area of the faceplate 102 may be free of bright or dark spots of light. The dot pattern may also be configured to dot the areas directly behind the indicia of the faceplate 102 less heavily and/or with lighter color so that those labels appear more prominently from the background.

As noted above, a load control device, such as the load control device 100, may include the light-guiding component 188 instead of the light-guiding component 158. The primary difference between the light-guiding component 188 and the light-guiding component 158 is that the light-guiding component 188 includes a plurality of ridges 186, which for example, may be used instead of a dot pattern. The light-guiding component 188 may be made of a variety of materials suitable for light transmission, including, for example, polycarbonate plastic and/or glass. When installed in the load control device 100, the light-guiding component 188 may be positioned in front of the structure of the load control device 100 that may itself be located in front of the front PCB 136. For example, the light-guiding component 188 may be placed in front of a driven element of an antenna of the load control device 100 (e.g., such as the antenna described herein), the bezel 114, the conductive component 210, and/or the like. The structure and the front of the PCT 136 may be painted a reflective color (e.g., white) to direct light towards the front surface of the load control device 100. In one or more examples, the light-guiding component 188 may be attached to the front surface of the bezel 114 in an area substantially aligned with the target illumination area of the faceplate 102. The light-guiding component 188 may be attached to the bezel 114 using various mechanisms such a two-shot molding process, an insert molding process, a snapping mechanism, such as screw bosses 187, and/or the like. The screw bosses 187 may receive screws and may be used for mechanical security of the light-guiding component 188.

The light-guiding component 188 may have a dimension suitable for installation within the load control device 100 and/or for guiding light towards a target illumination area of the front surface (e.g., the faceplate 102). For example, the light-guiding component 188 may have a thickness fitting for accommodation between the faceplate 102 and the structure described herein. The light-guiding component 188 may have a substantially planar portion 189, the shape of which conforms to the shape of the faceplate 102 and/or the structure. Further, the light-guiding component 188 may comprise a curved end portion 180 that may extend between the light source 157 (e.g., one or more LEDs, such as side firing LEDs, on the front PCB 136) and the planar portion 189 of the light-guiding component 188. When one or more LED devices are used as the light source 157, the curved end portion 180 may be aligned with the firing sides of the one or more LED devices, and may operate to guide the light emitted by the LED devices in multiple directions and/or at different angles towards the target illumination area of the faceplate 102. For example, the curved end portion 180 of the light-guiding component 188 may comprise a rear curved surface configured to reflect light emitted by the LEDs towards the front surface of the load control device 100 and a front curved surface configured to reflect light away from the front surface and towards the planar portion of the light-guiding component. As a result, the uniformity of the light transmission may be improved. Problems (e.g., hot and/or dark spots) commonly associated with light transmission in tight space (e.g., such as the limited space occupied by the load control device 100) may also be reduced or eliminated.

The light-guiding component 188 may have a distal end portion 181 that is configured to illuminate the front surface of the load control device 100 beyond the distal end 181. The distal end 181 may be beveled or curved, and may be on the opposite side of the first curved end portion 180 and across from the light source 157. The distal end portion 181 may operate to direct light from the light source 157 to areas beyond the boundaries of the light-guiding component 188 and thereby increase the illumination range of the light source 157. For example, a faceplate (e.g., faceplate 102) may overlay the light-guiding component 188 when the faceplate is installed on the load control device 100. The faceplate may include indicia (e.g., text and/or graphics) defined and/or underlined by perforations in the faceplate. When the faceplate is installed on the load control device 100, the indicia may be located within an area $A_{indicia}$ (e.g., as shown in FIGS. 1 and 4B) that may have a length substantially equal to the length of the opening 106 of the faceplate 102 and a width at least equal to the width of the text and/or graphics of the indicia. The indicia may extend outside the physical boundaries of the underlying light-guiding component 188, which may be represented by an area $A_{lightpipe}$ (e.g., as shown in FIGS. 1 and 4B). The area $A_{lightpipe}$ may also span the entire length of the opening 106 of the faceplate 102 but with a width shorter than that of the area $A_{indicia}$. As such, the light-guiding component 188 may include a beveled or curved distal end portion 181 that directs light to areas greater than the surface area (e.g., area $A_{lightpipe}$, as shown in FIGS. 1 and 4B) of the light-guiding component 188 to illuminate the indicia of the faceplate. This is because light entering from the first curved end portion 189 may be projected from the beveled (or curved) distal end portion 181 orthogonally or at an obtuse angle towards the faceplate and illuminate an area (e.g., the part of the indicia extending outside of the area $A_{lightpipe}$, as shown in FIGS. 1 and 4B) that is located outside of the area directly overtop the light guiding component 188.

The light-guiding component 188 may comprise a plurality of ridges 186. The ridges 186 may reside on a top or bottom surface and extend along the full length, or a portion of the length, of the light-guiding component 188. The ridges 186 may be configured to control the transmission of light from the light source 157 onto a target illumination area of the faceplate 102. For example, the ridges 186 may be configured to control the amount of light from the light source 157 that can pass through the light-guiding component 188 to reach the target illumination area of the faceplate 102. The ridges 186 may be configured to control the distribution of the light from the light source 157 onto the target illumination area of the faceplate 102.

The ridges 186 may be configured to affect the deflection of the light from the light source 157. For example, the ridges 186 may be carved into the top surface of the light-guiding component 188 such that light hitting the ridges 186 may be reflected onto the front surface of load control device 100 in the areas above the ridges. The ridges 186 may be configured to do one or more of the above to disperse the light from the light source 157 with substantial uniformity to the target area of the faceplate 102. In some examples, the faceplate 102 may comprise a plurality of perforations arranged to form a line below every indicator label (e.g., as shown in FIG. 1). The light-guiding component 188 be configured to have more ridges, deeper ridges, and/or ridges having different angles along the perforated lines in the faceplate 102 so that those lines do not appear too bright when compared to the rest of the target illumination area. The ridges 186 may not extend across the light-guiding component 188 all way towards the distal end portion 181 (e.g., there may be shallower or no ridges 186 in the areas closer to the light source 157 and deeper or more ridges 186 in the areas farther away from the light source 157), so that the entire target area of the faceplate 102 may be free of bright or dark spots of light. The ridges 186 may also be configured to be shallower, further apart, or non-existent (e.g., as shown) in the areas directly behind the indicia of the faceplate 102 so that those labels appear more prominently from the background.

The load control device 100 may include an antenna (e.g., a slot antenna). The antenna may comprise a driven element 150, and for example, may include one or more other elements. For example, the antenna may comprise any combination of the driven element 150, a conductive member 170, the yoke 120, one or more conductive elements (e.g., a conductive faceplate, a conductive component, and/or a conductive backer, as described herein), and/or the like.

The load control device 100 may include a wireless communication circuit (not shown) that may be mounted to the rear PCB 128 inside the enclosure 126. The driven element 150 may be coupled to the wireless communication circuit. For example, the wireless communication circuit may drive the driven element 150 of the antenna. The wireless communication circuit may be used for transmitting and/or receiving radio-frequency (RF) signals, for example, via the antenna. The wireless communication circuit may communicate RF signals at a communication frequency $f_{RF}$ (e.g., approximately 434 MHz). For example, the wireless communication circuit may include an RF receiver, an RF transmitter, and/or an RF transceiver. The wireless communication circuit may be mounted to the rear PCB 128 inside the enclosure 126. Examples of antennas of the load control device 100 are described in commonly-assigned U.S. patent application Ser. No. 14/724,607, filed May 28, 2015, U.S. patent application Ser. No. 14/879,986, filed Oct. 9, 2015, both entitled WIRELESS CONTROL DEVICE, the entire disclosures of which are hereby incorporated by reference.

The body portion 105 may be made from, for example, a non-conductive material, such as plastic. The body portion 105 of the faceplate 102 may be made from a conductive material, such as metal, for example. The body portion 105 may be made of a non-conductive material and the front surface 107 may include a conductive material, which, for example, may be arranged over a plastic carrier (not shown). The plastic carrier may be approximately the same size and shape as the faceplate 102. The conductive material may be made of one or more metallic materials and be substantially planar. For example, the conductive material may be substantially planar except for outer portions that may wrap around the edges of the faceplate 102. The conductive material may have one or more finishes. Example finishes for the conductive material include satin nickel, antique brass, bright chrome, stainless steel, gold, or clear anodized aluminum. In some examples, instead of being arranged over a plastic carrier, the faceplate 102 may be made entirely of metal (e.g., without the plastic carrier). In some other examples, the conductive material may be integrated into the plastic carrier.

The load control device 100 may include a conductive member 170. The conductive member 170 may be a conductive label, such as a metal label. The conductive member 170 may wrap around the back of the enclosure 126 between points on opposite sides 121 of the yoke 120. In other words, the conductive member 170 may extend horizontally around the back of the enclosure 126 at the center of the yoke 120. The conductive member 170 may be directly connected or capacitively coupled to the opposite sides 121 of the yoke 120. For example, the conductive member 170 may be screwed to the yoke 120 via one or more conductive screws. The conductive member 170 may include a conductive coating, a conductive paint, a conductive label, and/or a conductive strap. The strap may be made of a conductive material, such as metal. The strap may be strapped onto the load control device 100 around the back side of the enclosure 126 extending from both sides 121 of the yoke 120. The enclosure 126 may be a metalized enclosure made of a conductive material or infused with a conductive material. The conductive member 170 may be a part of the enclosure 126 and/or inside of the enclosure. For example, the conductive member 170 may be integrated into the enclosure 126.

The yoke 120 may be approximately as wide as the enclosure 126, for example, to provide for capacitive coupling between the conductive member 170 and the yoke 120.

If the load control device 100 is installed in a metal wallbox and the sides 121 of the yoke 120 (e.g., near the center of the yoke 120 where the conductive member 170 is capacitively coupled to the yoke) become electrically shorted to the metal wallbox, the communication range of the antenna at the communication frequency $f_{RF}$ may be affected. The load control device 100 may include a non-conductive element (not shown) to prevent the sides 121 of the yoke 120 from contacting the metal wallbox. For example, the non-conductive element (e.g., electrical tape) may be adhered to the sides 121 of the yoke 120. The non-conductive cradle 132 may have tabs (not shown) that extend out from the sides of the cradle 132 beyond the sides 121 of the yoke 120. The non-conductive cradle 132 may have flanges (not shown) that extend out from the sides of the cradle 132 and wrap around the sides 121 of the yoke 120. The non-conductive cradle 132 extend slightly beyond the sides 121 of the yoke 120 (e.g., by approximately 0.040 inch). The non-conductive cradle 132 may have one or more nubs (not shown) that are positioned in cut-outs (not shown) in the yoke 120, such that the nubs extend into the plane of the yoke 120 and extend beyond the sides 121 of the yoke 120.

The driven element 150 of the antenna may be formed of a conductive material (e.g., an electrically-conductive material). The driven element 150 may be substantially planar. For example, the driven element 150 may be substantially planar except for feet 155, for example, as shown in FIG. 9. The driven element 150 may be located between the bezel 114 and the front PCB 136. The driven element 150 may be attached to a rear surface of the bezel 114. The driven element 150 may also be printed or painted on the rear surface of the bezel 114 or be adhered to the rear surface of the bezel 114 as a conductive label.

The driven element 150 may include a main slot 152. The main slot 152 may be elongated and extend along the longitudinal axis of the load control device 100. The main slot 152 may be approximately the same size as the opening 106 in the faceplate 102. When the faceplate 102 is installed in the load control device 100, the main slot 152 of the driven element 150 may be aligned with the opening 106 of the faceplate 102. The actuation posts 146 of the actuation members 112 may extend through the main slot 152 of the driven element 150 and the openings 148 of the front PCB 136 to reach the touch sensitive device 130.

The driven element 150 may include additional openings 163, which may be placed in substantial alignment with the light source 157 (e.g., one or more LEDs, such as side firing LEDs) and/or the one or more protrusions 162 of the light-guiding component 158 to accommodate the light source 157 and/or allow the light generated by the light source 157 to pass through. The one or more protrusions 162 of the light-guiding component 158 may also extend through the openings 163 to become substantially aligned with the one or more LEDs. The additional openings 163 may extend from the main slot 152. The lengths and/or widths of the main slot 152 and the openings 163 of the driven element 150 may determine the inductance of the driven element 150. The resonant frequency of the antenna may be a function of the inductance of the driven elements 150. The resonant frequency of the antenna may be a function of the dimensions (e.g., lengths and/or widths) of the main slot 152 and the openings 163. A communication range (e.g., a transmission range and/or reception range) of the antenna at the communication frequency $f_{RF}$ of the wireless communication circuit may depend on the lengths and/or widths of the main slot 152 and the openings 163. The overall size of the driven element 150 and the dimensions of the main slot 152 and the openings 163 may be limited by the size of the mechanical structures of the load control device 100 (e.g., the bezel 114). At some communication frequencies (e.g., around 434 MHz), the desired length of the main slot 152 to maximize the communication range of the antenna may be longer than length of bezel 114.

At higher communication frequencies (e.g., around 2.4 GHz), the desired length of the main slot 152 to maximize the communication range of the antenna may be shorter. Accordingly, the length of the main slot 152 may be shortened. The antenna of the load control device 100 may include a dual resonant structure having two resonant frequencies, such that the load control device 100 is able to communicate at two different communication frequencies (e.g., approximately 434 MHz and 868 MHz).

The driven element 150 may include the feet 155 (e.g., drive points) that may be electrically connected to pads 156 on the front PCB 136 to allow for electrical connection to the wireless communication circuit on the rear PCB 128 through the connectors 145. The feet 155 may be located on opposite sides of the main slot 152. The feet 155 may be located at approximately the middle of the main slot 152, as exemplified in FIG. 9. The wireless communication circuit may be configured to drive the feet 155 differentially, such that the driven element 150 operates as part of a slot antenna and radiates RF signals. The driven element 150 may operate as a radiating element of the load control device 100. When the faceplate 102 includes a conductive material (e.g., metal), the driven element 150 may be capacitively coupled to the conductive material, such that the conductive material operates as a radiating element of the antenna.

A radiating element may be any element that radiates a signal (e.g., a RF signal). For example, one or more of the driven element 150, the conductive member 170, the yoke 120, and/or one or more of the conductive elements (e.g., a conductive faceplate and/or a conductive component described herein) may act as a radiating element of the antenna. One of the radiating elements may be referred to as an outer-most radiating element. The outer-most radiating element may be the structure that interfaces with the broadcasting medium (e.g., ambient air that is immediately surrounding the load control device 100). For example, the driven element 150 and/or one of the conductive elements (e.g., a conductive faceplate and/or a conductive component described herein) may operate as the outer-most radiating element when, for example, the faceplate 102 is not installed on the load control device 100 or a non-conductive (e.g., 100% plastic) faceplate is installed on the load control device 100.

The load control device 100 may include a conductive component 210. In one or more examples, the conductive component 210 may be attached to the front surface of the bezel 114. In one or more examples, the conductive component 210 may be located in a location other than the front surface of the bezel 114 (e.g., the conductive component 210 may be attached to the rear surface of the bezel 114). The conductive component 210 may operate to bring the impedance of the antenna when a non-conductive faceplate is installed closer to the impedance of the antenna when a conductive faceplate is installed, and consequently keep the communication range of the load control device 100 consistent across varying configurations. The conductive component 210 may be used with any load control device described herein, for example, in addition to or in lieu of a conductive backer. The load control device 100 may comprise a conductive backer, for example, in addition to or in lieu of the conductive component 210. The conductive backer may be formed as a part of a faceplate (e.g., the faceplate 102), for example, integrated onto a back surface of the faceplate or internal to the faceplate 102. The conductive backer may be attached to the adapter plate 104 (e.g., the front or rear surface of the adapter plate).

The conductive component 210 may comprise a conductive material, such as, for example, a metallic sheet and/or the like. The conductive component 210 may be made from one or more metallic materials. The conductive component 210 may act as a radiating element of the antenna. When installed with a non-conductive faceplate on the load control device 100, the conductive component 210 may operate as the outer-most radiating element of the antenna; when installed with a conductive faceplate on the load control device 100, the conductive component 210 may operate as a radiating element of the antenna and/or a capacitive coupling member. When the faceplate 102 is conductive, the conductive material of the faceplate 102 may act as the outer-most radiating element of the antenna and be capacitively coupled to the driven element 150 by the conductive component 210.

The front surface of the conductive component 210 may be substantially parallel to the front surface of the driven element 150. The conductive component 210 may be directly connected or capacitively coupled to the opposite sides 121 of the yoke 120. The conductive component 210 may be capacitively coupled to the driven element 150. The conductive component 210 may include an elongated slot 214 (e.g., an elongated central slot) that extends along the longitudinal axis of the load control device 100. The elongated slot 214 may be approximately the same size as and substantially aligned with the opening 106 in the faceplate 102 to, for example, allow the front surface of the actuation members 112 to extend through both openings. The elongated slot 214 may be substantially the same size as and substantially aligned with the main slot 152 of the driven element. The conductive component 210 may include a second slot 217 substantially parallel to the elongated slot 214.

The conductive component 210 may be electrically coupled to the yoke 120, such that the antenna of the load control device 100 may operate as a patch antenna (e.g., a hybrid slot-patch, or slatch antenna). For example, the conductive component 210 may be connected to the yoke via a screw 218 (e.g., an electrically conductive screw) that extends through an opening 212 in the conductive component 210, an opening 115 in the bezel 114 (e.g., as illustrated by FIG. 9 and FIG. 10) and/or openings in the components located between the bezel 114 and the yoke.

Figure 12C:
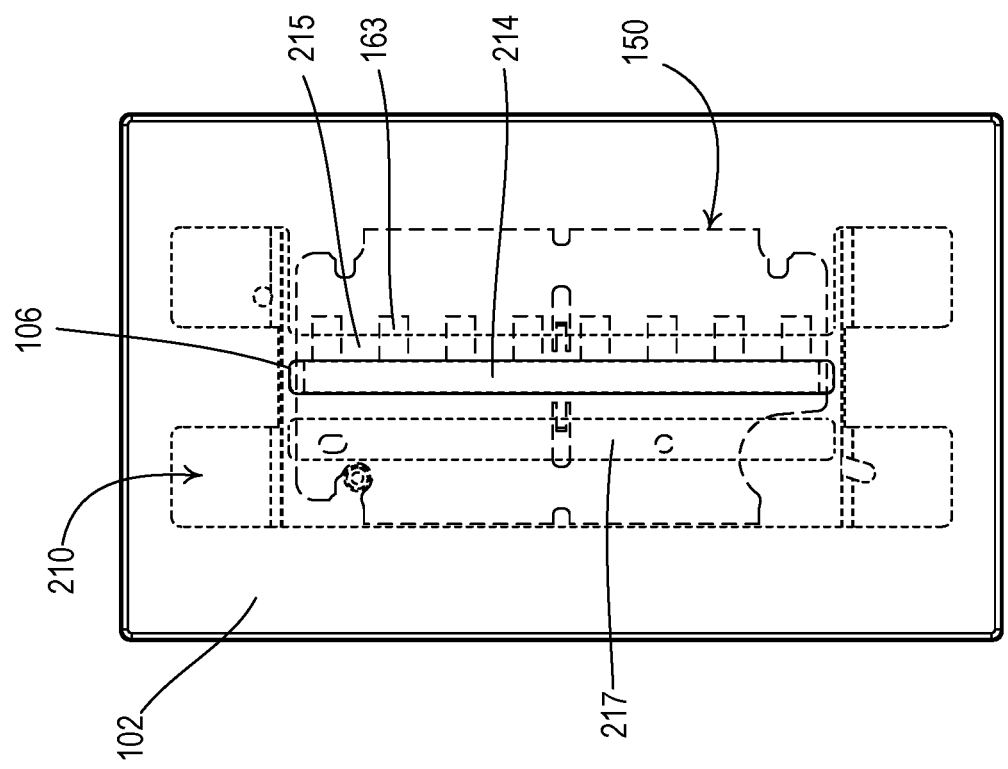
FIG. 12C is a front view of an example faceplate, an example conductive component, and an example driven element of the load control device of FIG. 1 overlaid on top of each other.

The conductive component 210 may be attached to the front surface of the bezel 114. The conductive component 210 may include an opening 216, and the bezel 114 may include a mounting element 133. The mounting element 133 may extend through the opening 216 and attach the conductive component 210 to the bezel 114. The screw 218 and the openings 212 and 115 described herein may provide additional support for the attachment. The conductive component 210 may include an indentation in the area in front of the light-guiding component 158 to allow light generated by the light source 157 to pass through and illuminate the labels on the faceplate 102. The indentation may be next to the elongated slot 214 of the conductive component 210. The narrow portion of the conductive component 210 between the elongated slot 214 and the indentation may form a conductive strip 215 that may be configured to be substantially aligned with the openings 163 of the driven element 150 (e.g., as shown in FIG. 12C) such that the conductive strip 215 may be operable to, for example, counteract any effect the openings 163 may have on the communication characteristics of the antenna.

The conductive component 210 may provide consistency in the RF communication range of the load control device 100, for example, independent of the type of material used for the faceplate 102. In the foregoing example structure of the load control device 100, the elongated slot 214 of the conductive component 210 may be characterized by an inductance. The coupling of the conductive component 210 to the yoke 120 through a low impedance path (e.g., through the screw 218 and one of the screws 140) may be represented by a series combination of an inductance and a resistance. Further, when a non-conductive faceplate is used, the capacitive coupling between the conductive component 210 and the two sides of the slots 152 of the driven element 150 may produce capacitances $C_{G1}$ and $C_{G2}$, the value of which may depend on the distance $D_{OFFSET-PLASTIC}$ between the conductive component 210 and the driven element 150. Likewise, when a conductive faceplate is used, two similar capacitances may be generated from the capacitive coupling between the conductive faceplate and the two sides of the slots 152 of the driven element 150. In the latter instance, the value of the capacitances may depend on the distance $D_{OFFSET-METAL}$ between the conductive faceplate and the driven element 150. Examples of both distances $D_{OFFSET-PLASTIC}$ and $D_{OFFSET-METAL}$ are illustrated by FIG. 4A. Since the distance $D_{OFFSET-PLASTIC}$ may be smaller than the distance $D_{OFFSET-METAL}$ (e.g., because the driven element is closer to the conductive component 210 than to the conductive faceplate), the values of the capacitances $C_{G1}$, $C_{G2}$ may be larger in an installation that uses a non-conductive faceplate than an installation that uses a conductive faceplate. This change in the values of the capacitances $C_{G1}$, $C_{G2}$ from the one installation to the other may be minimized, however, by the additional capacitances $C_{L1}$ and $C_{L2}$ produced by the capacitive coupling of the conductive component 210 to the conductive material on each side of the opening 106 of the faceplate 102. As a result, an installation with a non-conductive faceplate may provide a capacitive loading on the antenna that is approximately equal to the capacitive loading provided by an installation with a conductive faceplate. The communication range and performance of the load control device 100 thereby may be kept consistent from one type of installation to the next.

Figure 12B:
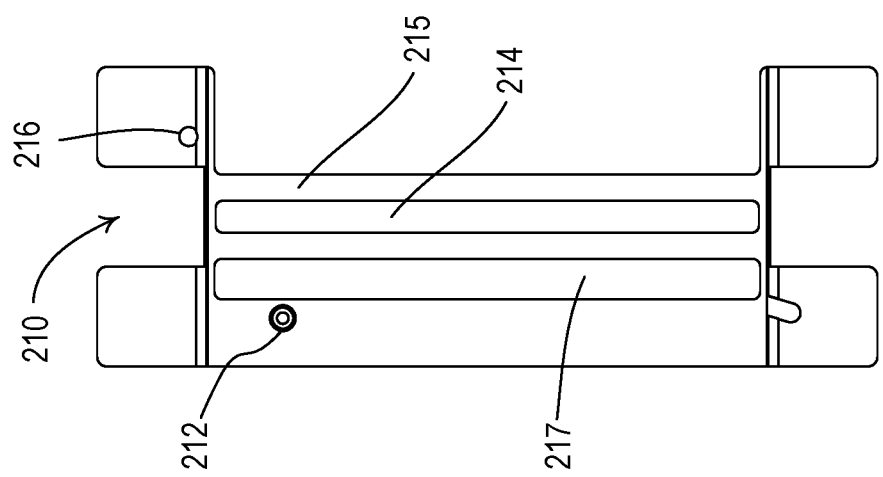
FIG. 12B is a front view of an example conductive component of the antenna of the load control device of FIG. 1.
Figure 12A:
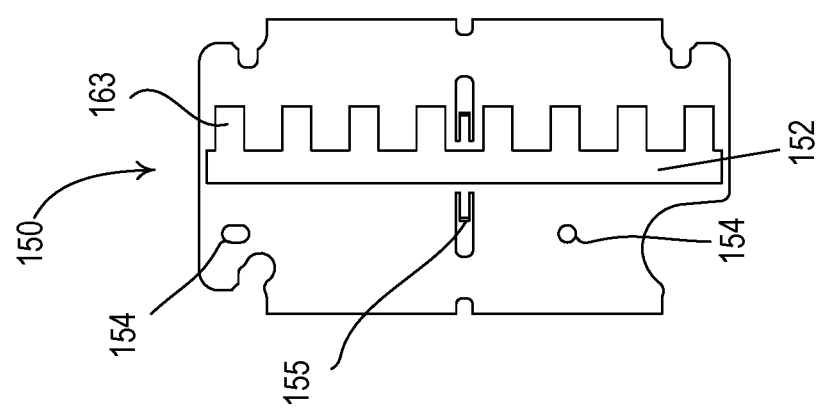
FIG. 12A is a front view of an example driven element of the load control device of FIG. 1.

FIG. 12A is a front view of the conductive component 210, and FIG. 12B is a front view of the driven element 150 of the antenna of the load control device 100. FIG. 12C is a front view of the faceplate 102, the conductive component 210, and the driven element 150 overlaid on top of each other. The two sides of the main slot 152 of the driven element 150 may be capacitively coupled together via a capacitance $C_{L3}$. The value of the capacitance $C_{L3}$ may depend upon the dimensions of the elongated slot 214 of the conductive component 210, the conductive strip 215 of the conductive component 210, the main slot 152 of the driven element 150, and the additional openings 163 of the driven element 150. Accordingly, by adjusting the aforementioned dimensions, the value of the capacitance $C_{D3}$ may be adjusted to bring the impedance of the antenna when a non-conductive faceplate is installed closer to the impedance of the antenna when a conductive faceplate is installed, thus ensuring that the communication range of the load control device 100 remains consistent.

Figure 14:
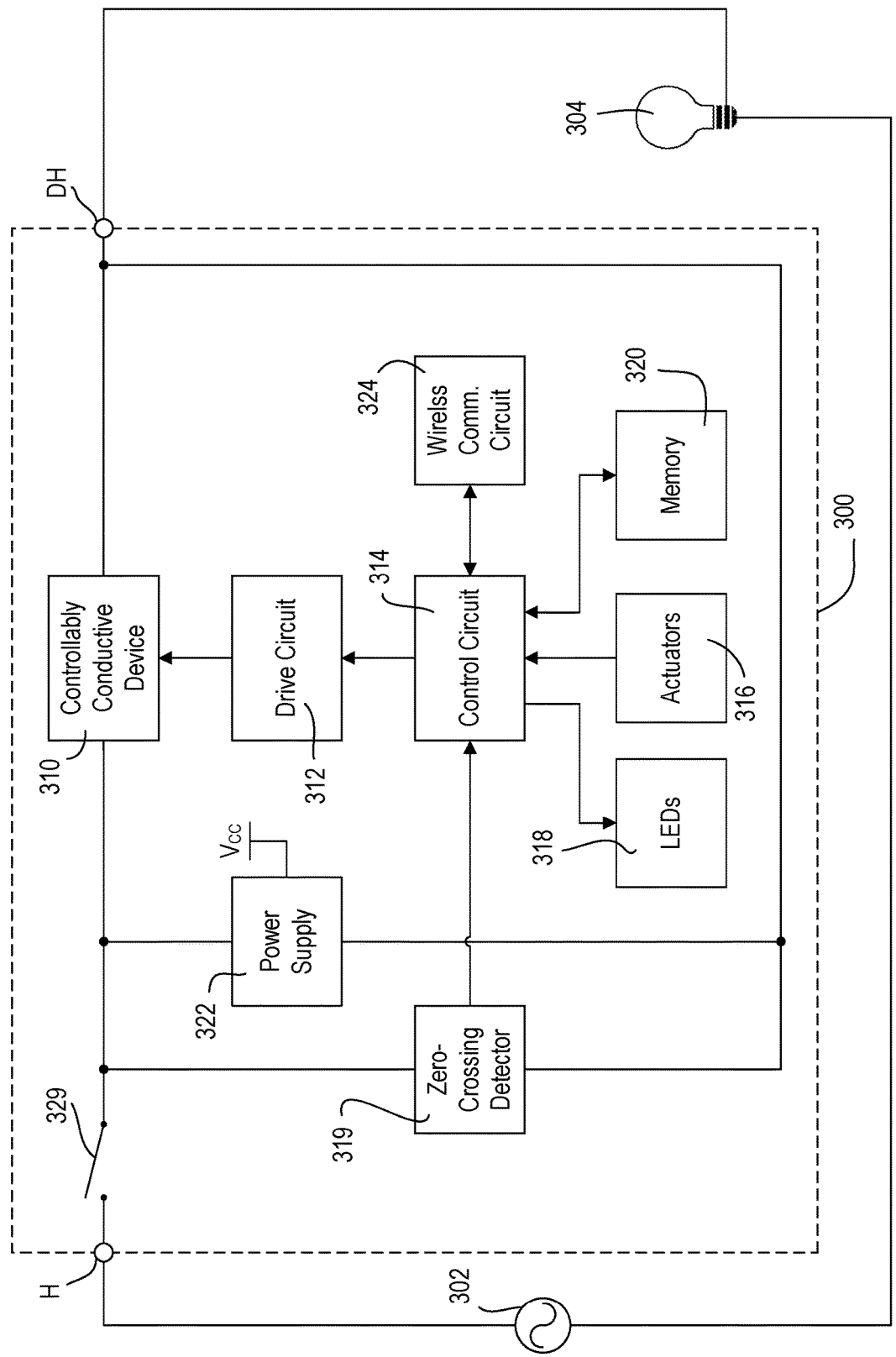
FIG. 14 is a simplified block diagram of an example load control device.

The load control device 100 may have a similar structure as the load control device 300 shown in FIG. 14. The load control device 100 may include a control circuit (e.g., such as the control circuit 314). The control circuit may include one or more of a processor (e.g., a microprocessor), a microcontroller, a programmable logic device (PLD), a field programmable gate array (FPGA), an application specific integrated circuit (ASIC), or any suitable controller or processing device. In one or more examples, the control circuit may be operatively coupled to the control input of a controllably conductive device (e.g., such as the controllable conductive device 310), for example, via a gate drive circuit (e.g., such as the gate drive circuit 312). The control circuit may be used for rendering the controllably conductive device conductive or non-conductive, for example, to control the amount of power delivered to the lighting load. In one or more examples, the load control device 100 may not comprise the controllably conductive device and the gate drive circuit. The control circuit may receive inputs from the actuation members 112. The control circuit may individually control the LEDs 149 to illuminate the visual indicator for each of the actuation members 112.

The control circuit may receive a control signal representative of the zero-crossing points of the AC main line voltage of the AC power source (e.g., such as the AC power source 302) from a zero-crossing detector (e.g., such as the zero-crossing detector 319). The control circuit may be operable to render the controllably conductive device conductive and/or non-conductive at predetermined times relative to the zero-crossing points of the AC waveform using a phase-control dimming technique.

The load control device 100 may include a memory (e.g., such as the memory 320). The memory may be communicatively coupled to the control circuit for the storage and/or retrieval of, for example, operational settings, such as, lighting presets and associated preset light intensities. The memory may be implemented as an external integrated circuit (IC) or as an internal circuit of the control circuit. The load control device 100 may include a power supply (e.g., such as the power supply 322). The power supply may generate a direct-current (DC) supply voltage $V_{CC}$ for powering the control circuit and the other low-voltage circuitry of the load control device 100. The power supply may be coupled in parallel with the controllably conductive device. The power supply may be operable to conduct a charging current through the lighting load to generate the DC supply voltage $V_{CC}$.

The wireless communication circuit of the load control device 100 may include a RF transceiver coupled to an antenna for transmitting and/or receiving RF signals. For example, the antenna may include the slot or slatch (slot/path) antenna described above. The control circuit may be coupled to the wireless communication circuit for transmitting and/or receiving digital messages via the RF signals. The control circuit may be operable to control the controllably conductive device to adjust the intensity of the lighting load in response to the digital messages received via the RF signals. The control circuit may transmit feedback information regarding the amount of power being delivered to the lighting load via the digital messages included in the RF signals. The control circuit may be configured to transmit RF signals while the actuation members 112 are being actuated, since the communication range of the antenna may be temporarily increased while a user's finger is adjacent the main slot 152 of the driven element 150. The wireless communication circuit may include an RF transmitter for transmitting RF signals, an RF receiver for receiving RF signals, or an infrared (IR) transmitter and/or receiver for transmitting and/or receiving IR signals.

Figure 13:
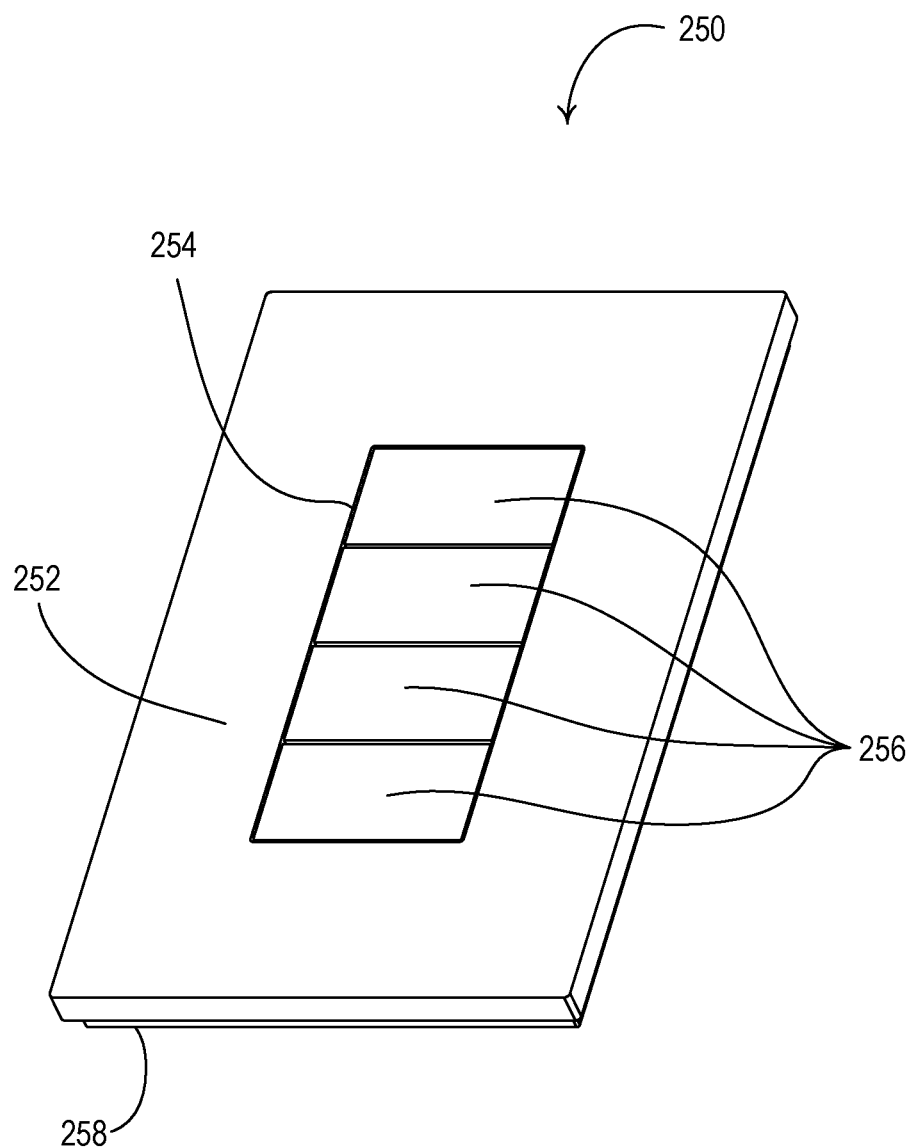
FIG. 13 is a perspective view of an example wireless control device.

FIG. 13 is a perspective view of an example wireless control device 250, e.g., a keypad device. The wireless control device 250 may include a faceplate 252 having an opening 254 for receiving a plurality of buttons 256. The faceplate 252 may be adapted to connect to an adapter plate 258 (e.g., in a similar manner as the faceplate 102 connects to the adapter plate 104). The wireless control device 250 may be configured to transmit RF signals in response to actuations of the buttons 256. The faceplate 252 may include a conductive faceplate. The faceplate 252 may include a conductive material arranged over a plastic carrier. The buttons 256 may be made of a non-conductive material, such as plastic or glass. The wireless control device 250 may include an antenna having a driven element that is capacitively coupled to the conductive material of the faceplate 252, such that the conductive material operates as a radiating element of the antenna. The conductive material of the faceplate 252 may be directly electrically coupled to a yoke of the wireless control device 250 at a single electrical connection. The buttons 256 may be made of a conductive material, for example, a metallic sheet attached to a plastic carrier.

In one or more examples, the control device 250 may be a wired control device, for example, similar to the control device 100. In such examples, the difference between the control device 250 and the control device 100 may be the inclusion of the buttons 256 instead of the plurality of actuation members 112. The load control device 250 may include a light source (e.g., the light source 157) and a light-guiding component (e.g., the light-guiding component 158, the light-guiding component 188, etc.) configured to control the transmission of light from the light source, for example, as described herein. The light source and the light-guiding component may operate to, for example, uniformly illuminate a certain area of the faceplate 252. For example, the buttons 256 may include indicia (e.g., text and/or graphics) that may be engraved in the opaque material, and the light source and light-guiding component may illuminate the area containing the indicia for indicating the various use scenarios associated with the buttons 256, for example, as described herein. Further, as noted above, the light source and light-guiding component may be used for other illumination purposes such as highlighting the entire surface of the faceplate 252 or outlining the borders of the faceplate 252 in a dark environment.

FIG. 14 is a simplified block diagram of an example load control device 300 that may be deployed as, for example, the load control device 100 shown in FIG. 1-12C). The load control device 300 may include a hot terminal H that may be adapted to be coupled to an AC power source 302. The load control device 300 may include a dimmed hot terminal DH that may be adapted to be coupled to an electrical load, such as a lighting load 304. The load control device 300 may include a controllably conductive device 310 coupled in series electrical connection between the AC power source 302 and the lighting load 304. The controllably conductive device 310 may control the power delivered to the lighting load. The controllably conductive device 310 may include a suitable type of bidirectional semiconductor switch, such as, for example, a triac, a field-effect transistor (FET) in a rectifier bridge, two FETs in anti-series connection, or one or more insulated-gate bipolar junction transistors (IGBTs). An air-gap switch 329 may be coupled in series with the controllably conductive device 310. The air-gap switch 329 may be opened and closed in response to actuations of an air-gap actuator (e.g., the air-gap switch actuator 129). When the air-gap switch 329 is closed, the controllably conductive device 310 is operable to conduct current to the load. When the air-gap switch 329 is open, the lighting load 304 is disconnected from the AC power source 302.

The load control device 300 may include a control circuit 314. The control circuit 314 may include one or more of a processor (e.g., a microprocessor), a microcontroller, a programmable logic device (PLD), a field programmable gate array (FPGA), an application specific integrated circuit (ASIC), or any suitable controller or processing device. The control circuit 314 may be operatively coupled to a control input of the controllably conductive device 310, for example, via a gate drive circuit 312. The control circuit 314 may be used for rendering the controllably conductive device 310 conductive or non-conductive, for example, to control the amount of power delivered to the lighting load 304. The control circuit 314 may receive inputs from a touch sensitive actuator 316 (e.g., the touch sensitive actuator 110). The control circuit 314 may individually control LEDs 318 (e.g., the LEDs 149) to illuminate a linear array of visual indicators on the touch sensitive actuator.

The control circuit 314 may receive a control signal representative of the zero-crossing points of the AC main line voltage of the AC power source 302 from a zero-crossing detector 319. The control circuit 314 may be operable to render the controllably conductive device 310 conductive and/or non-conductive at predetermined times relative to the zero-crossing points of the AC waveform using a phase-control dimming technique. Examples of dimmers are described in greater detail in commonly-assigned U.S. Pat. No. 7,242,150, issued Jul. 10, 2007, entitled DIMMER HAVING A POWER SUPPLY MONITORING CIRCUIT; U.S. Pat. No. 7,546,473, issued Jun. 9, 2009, entitled DIMMER HAVING A MICROPROCESSOR-CONTROLLED POWER SUPPLY; and U.S. Pat. No. 8,664,881, issued Mar. 4, 2014, entitled TWO-WIRE DIMMER SWITCH FOR LOW-POWER LOADS, the entire disclosures of which are hereby incorporated by reference.

The load control device 300 may include a memory 320. The memory 320 may be communicatively coupled to the control circuit 314 for the storage and/or retrieval of, for example, operational settings, such as, lighting presets and associated preset light intensities. The memory 320 may be implemented as an external integrated circuit (IC) or as an internal circuit of the control circuit 314. The load control device 300 may include a power supply 322. The power supply 322 may generate a direct-current (DC) supply voltage $V_{CC}$ for powering the control circuit 314 and the other low-voltage circuitry of the load control device 300. The power supply 322 may be coupled in parallel with the controllably conductive device 310. The power supply 322 may be operable to conduct a charging current through the lighting load 304 to generate the DC supply voltage $V_{CC}$.

The load control device 300 may include a wireless communication circuit 324. The wireless communication circuit 324 may include a RF transceiver coupled to an antenna for transmitting and/or receiving RF signals. For example, the antenna may include the slot or slatch antenna of the load control device 100 shown in FIG. 1-12C. The control circuit 314 may be coupled to the wireless communication circuit 324 for transmitting and/or receiving digital messages via the RF signals. The control circuit 314 may be operable to control the controllably conductive device 310 to adjust the intensity of the lighting load 304 in response to the digital messages received via the RF signals. The control circuit 314 may transmit feedback information regarding the amount of power being delivered to the lighting load 304 via the digital messages included in the RF signals. The control circuit 314 may be configured to transmit RF signals while the touch sensitive actuator 316 is being actuated, since the communication range of the antenna may be temporarily increased while a user's finger is adjacent the main slot 152 of the driven element 150. The wireless communication circuit 324 may include an RF transmitter for transmitting RF signals, an RF receiver for receiving RF signals, or an infrared (IR) transmitter and/or receiver for transmitting and/or receiving IR signals.

FIG. 15 is a simple diagram of an example load control system 400 (e.g., a lighting control system) in which a wall-mounted load control device 410 having a thin touch sensitive actuator (e.g., the load control device 100, the load control device 250, etc.) may be deployed. The wall-mounted load control device 410 may be coupled in series electrical connection between an AC power source 402 and a first lighting load, e.g., a first light bulb 412 installed in a ceiling mounted downlight fixture 414. The first light bulb 412 may be installed in a wall-mounted lighting fixture or other lighting fixture mounted to another surface. The wall-mounted load control device 410 may be adapted to be wall-mounted in a standard electrical wallbox. The load control system 400 may include another load control device, e.g., a plug-in load control device 420. The plug-in load control device 420 may be coupled in series electrical connection between the AC power source 402 and a second lighting load, e.g., a second light bulb 422 installed in a lamp (e.g., a table lamp 424). The plug-in load control device 420 may be plugged into an electrical receptacle 426 that is powered by the AC power source 402. The table lamp 424 may be plugged into the plug-in load control device 420. The second light bulb 422 may be installed in a table lamp or other lamp that may be plugged into the plug-in load control device 420. The plug-in load control device 420 may be implemented as a table-top load control device, or a remotely-mounted load control device.

The wall-mounted load control device 410 may include a touch sensitive actuator 416 (e.g., the touch sensitive actuator 110 of the load control device 100) for controlling the light bulb 412. In response to actuation of the touch sensitive actuator 416, the wall-mounted load control device 410 may be configured to turn the light bulb 412 on and off, and to increase or decrease the amount of power delivered to the light bulb. The wall-mounted load control device 410 may vary the intensity of the light bulb by varying the amount of power delivered to the light bulb. The wall-mounted load control device 410 may increase or decrease the intensity of the light bulb from a minimum intensity (e.g., approximately 1%) to a maximum intensity (e.g., approximately 100%). The wall-mounted load control device 410 may be configured to provide visual indicators. The visual indicators may be arranged in a linear array on the touch sensitive actuator 416. The wall-mounted load control device 410 may be configured to illuminate the visual indicators to provide feedback of the intensity of the light bulb 412. Examples of wall-mounted dimmer switches are described in greater detail in U.S. Pat. No. 5,248,919, issued Sep. 29, 1993, entitled LIGHTING CONTROL DEVICE, and U.S. patent application Ser. No. 13/780,514, filed Feb. 28, 2013, entitled WIRELESS LOAD CONTROL DEVICE, the entire disclosures of which are hereby incorporated by reference.

The load control system 400 may include a daylight control device, e.g., a motorized window treatment 430, mounted in front of a window for controlling the amount of daylight entering the space in which the load control system 400 is installed. The motorized window treatment 430 may include, for example, a cellular shade, a roller shade, a drapery, a Roman shade, a Venetian blind, a Persian blind, a pleated blind, a tensioned roller shade systems, or other suitable motorized window covering. The motorized window treatment 430 may include a motor drive unit 432 for adjusting the position of a covering material 434 of the motorized window treatment in order to control the amount of daylight entering the space. The motor drive unit 432 of the motorized window treatment 430 may have an RF receiver and an antenna mounted on or extending from a motor drive unit of the motorized window treatment. The motor drive unit 432 of the motorized window treatment 430 may be battery-powered or may receive power from an external direct-current (DC) power supply. Examples of battery-powered motorized window treatments are described in greater detail in commonly-assigned U.S. Patent Application Publication No. 2012/0261078, published Oct. 18, 2012, entitled MOTORIZED WINDOW TREATMENT, and U.S. patent application Ser. No. 13/798,946, filed Mar. 13, 2013, entitled BATTERY-POWERED ROLLER SHADE SYSTEM, the entire disclosures of which are hereby incorporated by reference.

The load control system 400 may include one or more input devices, e.g., RF transmitters, such as a wall-mounted remote control device 440, a battery-powered handheld remote control device 450, an occupancy sensor 460, or a daylight sensor 470. The wall-mounted load control device 410 and/or the plug-in load control device 420 may be configured to receive digital messages via wireless signals, e.g., radio-frequency (RF) signals 406. The wireless signals may be transmitted by the wall-mounted remote control device 440, the battery-powered remote control device 450, the occupancy sensor 460, or the daylight sensor 470. In response to the received digital messages, the wall-mounted load control device 410 and/or the plug-in load control device 420 may be configured to turn the respective light bulb 412, 422 on and off, and to increase or decrease the intensity of the respective light bulb. The wall-mounted load control device 410 and/or the plug-in load control device 420 may be implemented as electronic switches configured to turn on and off (e.g., only turn on and off) the respective light bulbs 412, 422.

The wall-mounted remote control device 440 may include a plurality of buttons 442 (e.g., similar to the buttons 256 of the wall-mounted load control device 250). The wall-mounted remote control device 440 may not include an internal load control circuit. The wall-mounted remote control device 440 may not directly be connected to an electrical load. The wall-mounted remote control device 440 may transmit RF signals 406 in response to actuations of the buttons 442. For example, the RF signals 406 may be transmitted at a communication frequency $f_{RF}$ (e.g., approximately 434 MHz) using a proprietary RF protocol, such as the ClearConnect® protocol. The wall-mounted load control device 410 may be configured to receive the RF signals transmitted by the wall-mounted remote control device 440, for example, to control the light bulb 412 in response to actuations of the buttons 442 of the wall-mounted remote control device 440. The RF signals 406 may be transmitted at a different communication frequency, such as, for example, 2.4 GHz or 5.6 GHz. The RF signals 406 may be transmitted using a different RF protocol, such as, for example, one of WIFI, ZIGBEE, Z-WAVE, KNX-RF, ENOCEAN RADIO protocols, or a different proprietary protocol. The load control system 400 may also comprise a wall-mounted remote control device having a plurality of actuation members for selecting one or more presets or scenes, for example, as discussed in greater detail with reference to FIG. 1-12C.

The load control system 400 may also comprise a wall-mounted remote control device (e.g., a wall-mounted keypad device) having a plurality of buttons for selecting one or more presets or scenes, for example, as discussed in greater detail with reference to FIG. 1-12C. The keypad device may comprise a plurality of actuation members. Each of the plurality of actuations members may be designated to actuate one or more operational settings (e.g., predetermined light intensities) associated with a specific use scenario, such as "Welcome," "Day," "Entertain," or "Goodnight." An operational setting may refer to predetermined and/or configurable operational parameters of one or more electrical loads, for example, light intensity, HVAC setting (e.g., temperature), window treatment setting, and/or the like. The specific use scenario associated with each of the plurality of actuation members of the keypad device may be indicated, for example, by one or more labels placed on a faceplate mounted to the wall-mounted load control device 410. The labels may be placed next to the plurality of actuation members describing their associated use scenarios, such as "Welcome," "Day," "Entertain," or "Goodnight." The wall-mounted load control device 410 may include one or more light sources (e.g., light-emitting diodes (LEDs)) and/or a light-guiding component (e.g., as described herein) for illuminating the plurality of actuation members and/or a certain area of the faceplate (e.g., the area containing the indicator labels).

The battery-powered remote control device 450 may include one or more actuators 452 (e.g., one or more of an on button, an off button, a raise button, a lower button, and a preset button). The battery-powered remote control device 450 may transmit RF signals 406 in response to actuations of one or more of the actuators 452. The battery-powered remote control device 450 may be handheld. The battery-powered remote control device 450 may be mounted vertically to a wall, or supported on a pedestal to be mounted on a tabletop. Examples of battery-powered remote control devices are described in greater detail in commonly-assigned U.S. Pat. No. 8,330,638, issued Dec. 11, 2012, entitled WIRELESS BATTERY-POWERED REMOTE CONTROL HAVING MULTIPLE MOUNTING MEANS, and U.S. Patent Application Publication No. 2012/0286940, published Nov. 12, 2012, entitled CONTROL DEVICE HAVING A NIGHTLIGHT, the entire disclosures of which are hereby incorporated by reference.

The occupancy sensor 460 may be configured to detect occupancy and vacancy conditions in the space in which the load control system 400 is installed. The occupancy sensor 460 may transmit digital messages to the wall-mounted load control device 410 and/or the plug-in load control device 420 via the RF signals 406 in response to detecting the occupancy or vacancy conditions. The wall-mounted load control device 410 and/or the plug-in load control device 420 may be configured to turn on the respective light bulb 412, 422 in response to receiving an occupied command. The wall-mounted load control device 410 and/or the plug-in load control device 420 may be configured to turn off the respective light bulb in response to receiving a vacant command. The occupancy sensor 460 may operate as a vacancy sensor to turn off (e.g., only turn off) the lighting loads in response to detecting a vacancy condition (e.g., to not turn on the light bulbs 412, 422 in response to detecting an occupancy condition). Examples of RF load control systems having occupancy and vacancy sensors are described in greater detail in commonly-assigned U.S. Pat. No. 8,009,042, issued Aug. 30, 2011 Sep. 3, 2008, entitled RADIO-FREQUENCY LIGHTING CONTROL SYSTEM WITH OCCUPANCY SENSING; U.S. Pat. No. 8,199,010, issued Jun. 12, 2012, entitled METHOD AND APPARATUS FOR CONFIGURING A WIRELESS SENSOR; and U.S. Pat. No. 8,228,184, issued Jul. 24, 2012, entitled BATTERY-POWERED OCCUPANCY SENSOR, the entire disclosures of which are hereby incorporated by reference.

The daylight sensor 470 may be configured to measure a total light intensity in the space in which the load control system is installed. The daylight sensor 470 may transmit digital messages including the measured light intensity to the wall-mounted load control device 410 and/or the plug-in load control device 420. The daylight sensor 470 may transmit digital messages via the RF signals 406 for controlling the intensities of the respective light bulbs 412, 422 in response to the measured light intensity. Examples of RF load control systems having daylight sensors are described in greater detail in commonly-assigned U.S. Pat. No. 8,410,706, issued Apr. 2, 2013, entitled METHOD OF CALIBRATING A DAYLIGHT SENSOR; and U.S. Pat. No. 8,451,116, issued May 28, 2013, entitled WIRELESS BATTERY-POWERED DAYLIGHT SENSOR, the entire disclosures of which are hereby incorporated by reference.

Digital messages transmitted by the input devices (e.g., the wall-mounted remote control device 440, the battery-powered remote control device 450, the occupancy sensor 460, and the daylight sensor 470) may include a command and identifying information, for example, a serial number (e.g., a unique identifier) associated with the transmitting input device. Each of the input devices may be assigned to the wall-mounted load control device 410 and/or the plug-in load control device 420 during a configuration procedure of the load control system 400, such that the wall-mounted load control device 410 and/or the plug-in load control device 420 are responsive to digital messages transmitted by the input devices via the RF signals 406. Examples of methods of associating wireless control devices are described in greater detail in commonly-assigned U.S. Patent Application Publication No. 2008/0111491, published May 15, 2008, entitled RADIO-FREQUENCY LIGHTING CONTROL SYSTEM, and U.S. Patent Application Publication No. 2013/0214609, published Aug. 22, 2013, entitled TWO-PART LOAD CONTROL SYSTEM MOUNTABLE TO A SINGLE ELECTRICAL WALLBOX, the entire disclosures of which are hereby incorporated by reference.

The load control system 400 may include a gateway device 480 (e.g., a bridge) configured to enable communication with a network 482, e.g., a wireless or wired local area network (LAN). The gateway device 480 may be connected to a router (not shown) via a wired digital communication link 484 (e.g., an Ethernet communication link). The router may allow for communication with the network 482, e.g., for access to the Internet. The gateway device 480 may be wirelessly connected to the network 482, e.g., using Wi-Fi technology.

The gateway device 480 may be configured to transmit RF signals 406 to the wall-mounted load control device 410 and/or the plug-in load control device 420 (e.g., using the proprietary protocol) for controlling the respective light bulbs 412, 422 in response to digital messages received from external devices via the network 482. The gateway device 480 may be configured to receive RF signals 406 from the wall-mounted load control device 410, the plug-in load control device 420, the motorized window treatment 430, the wall-mounted remote control device 440, the battery-powered remote control device 450, the occupancy sensor 460, and/or the daylight sensor 470 (e.g., using the proprietary protocol). The gateway device 480 may be configured to transmit digital messages via the network 482 for providing data (e.g., status information) to external devices. The gateway device 480 may operate as a central controller for the load control system 400, or may simply relay digital messages between the control devices of the load control system and the network 482.

The load control system 400 may include a network device 490, such as, a smart phone (for example, an iPhone® smart phone, an Android® smart phone, or a Blackberry® smart phone), a personal computer, a laptop, a wireless-capable media device (e.g., MP3 player, gaming device, or television), a tablet device, (for example, an iPad® hand-held computing device), a Wi-Fi or wireless-communication-capable television, or any other suitable Internet-Protocol-enabled device. The network device 490 may be operable to transmit digital messages in one or more Internet Protocol packets to the gateway device 480 via RF signals 408 either directly or via the network 482. For example, the network device 490 may transmit the RF signals 408 to the gateway device 480 via a Wi-Fi communication link, a Wi-MAX communications link, a Bluetooth® communications link, a near field communication (NFC) link, a cellular communications link, a television white space (TVWS) communication link, or any combination thereof. Examples of load control systems operable to communicate with network devices on a network are described in greater detail in commonly-assigned U.S. Patent Application Publication No. 2013/0030589, published Jan. 31, 2013, entitled LOAD CONTROL DEVICE HAVING INTERNET CONNECTIVITY, the entire disclosure of which is hereby incorporated by reference.

The network device 490 may include a visual display 492. The visual display 492 may include a touch screen that may include, for example, a capacitive touch pad displaced overtop the visual display, such that the visual display may display soft buttons that may be actuated by a user. The network device 490 may include a plurality of hard buttons, e.g., physical buttons (not shown), in addition to the visual display 492. The network device 490 may download a product control application for allowing a user of the network device to control the load control system 400. In response to actuations of the displayed soft buttons or hard buttons, the network device 490 may transmit digital messages to the gateway device 480 through the wireless communications described herein. The network device 490 may transmit digital messages to the gateway device 480 via the RF signals 408 for controlling the wall-mounted load control device 410 and/or the plug-in load control device 420. The gateway device 480 may be configured to transmit RF signals 408 to the network device 490 in response to digital messages received from the wall-mounted load control device 410, the plug-in load control device 420, the motorized window treatment 430, the wall-mounted remote control device 440, the battery-powered remote control device 450, the occupancy sensor 460, and/or the daylight sensor 470 (e.g., using the proprietary protocol) for displaying data (e.g., status information) on the visual display 492 of the network device.

The operation of the load control system 400 may be programmed and configured using the gateway device 480 and/or network device 490. An example of a configuration procedure for a wireless load control system is described in greater detail in commonly-assigned U.S. patent application Ser. No. 13/830,237, filed Mar. 14, 2013, entitled COMMISSIONING LOAD CONTROL SYSTEMS, the entire disclosure of which is hereby incorporated by reference.

When the load control system 400 is being installed and/or configured, the wall-mounted load control device 410 may be installed without a faceplate. When no faceplate is installed, the wall-mounted load control device 410 may be characterized by a first communication range $R_1$ at the communication frequency $f_{RF}$. When an appropriate faceplate (e.g., the conductive faceplate or the plastic faceplate having the conductive backer) is installed, the wall-mounted load control device 410 may be characterized by a second communication range $R_2$ greater than the first communication range $R_1$. The first communication range $R_1$ may be greater than or equal to a minimum acceptable communication range $R_{MIN}$ (e.g., approximately 30 feet), such that the load control device is able to properly transmit and receive the RF signals if no faceplate is installed while the load control system 400 is being installed and/or configured.

The wall-mounted load control device 400 may include a temporary radiating element (not shown) affixed to a front surface of the bezel (e.g., the bezel 114) for re-tuning the antenna of the control device while the load control system 400 is being installed and/or configured. The temporary radiating element may operate in a similar manner as the conductive backer on the plastic faceplate 102. The temporary radiating element may increase the communication range of the wall-mounted load control device 400 at the communication frequency $f_{RF}$ while the load control system 400 is being installed and/or configured. For example, the temporary radiating element may comprise a label affixed to the front surface of the bezel 114, where the label has an internal conductive element. After the load control system 400 is installed and configured, the temporary radiating element may be removed from the bezel 114 and the appropriate faceplate (e.g., the conductive faceplate, the plastic faceplate having the conductive backer, or the conductive faceplate having the conductive backer) may be installed on the wall-mounted load control device 400.

Examples of wireless load control systems are described in greater detail in commonly-assigned U.S. Pat. No. 5,982,103, issued May 18, 1999, entitled METHOD AND APPARATUS FOR CONTROLLING AND DETERMINING THE STATUS OF ELECTRICAL DEVICES FROM REMOTE LOCATIONS; and U.S. patent application Ser. No. 12/033,223, filed Feb. 19, 2008, entitled COMMUNICATION PROTOCOL FOR A RADIO-FREQUENCY LOAD CONTROL SYSTEM, the entire disclosures of all of which are hereby incorporated by reference.

What is claimed is:

1. A control device comprising:
    a planar front surface comprising at least one indicia;
    a planar printed circuit board;
        an antenna configured to transmit or receive radio frequency signals, the antenna structure located between the front surface and the printed circuit board;
    a radio-frequency communication circuit configured to transmit or receive the radio-frequency signals via the antenna;
    one or more side-firing LEDs mounted to the printed circuit board and configured to emit light along the plane of the printed circuit board via respective firing sides of the LEDs; and
    a light-guiding component comprising a planar portion, a curved portion and a plurality of protrusions, the planar portion located between the front surface and the antenna, the curved portion extending between the LEDs on the printed circuit board and the planar portion, the plurality of protrusions extending through one or more openings of the structure and configured to reflect light emitted by the one or more side-firing LEDs towards the front surface of the faceplate, the curved portion comprising a front curved surface and a rear curved surface, the rear curved surface of the curved portion configured to receive light emitted by the one or more side-firing LEDs and reflect the light in multiple directions towards the front surface of the control device to illuminate the at least one indicia, the front curved surface of the curved portion configured to reflect light emitted by the one or more side-firing LEDs away from the front surface of the control device and towards the planar portion of the light-guiding component.

2. The control device of claim 1, wherein the planar portion of the light-guiding component comprises a distal end opposite the curved portion, the distal end configured to illuminate the front surface beyond the distal end.

3. The control device of claim 1, wherein the curved portion of the light-guiding component comprises one or more protrusions extending from the rear curved surface of the light-guiding component and substantially aligned with the one or more side-firing LEDs mounted to the printed circuit board.

4. The control device of claim 1, further comprising:
a faceplate adapted to be mounted to the control device, the faceplate defining the front surface of the control device.

5. The control device of claim 1, wherein the light-guiding component comprises a plurality of ridges on the rear curved surface of the light-guiding component, the plurality of ridges configured to disperse light generated by the one or more LEDs towards the front surface of the control device with substantial uniformity.

6. The control device of claim 1, wherein the light-guiding component comprises a dot pattern printed on the rear curved surface of the light-guiding component, the dot pattern comprising a plurality of dots configured to disperse light generated by the one or more LEDs towards the front surface of the control device with substantial uniformity.

7. The control device of claim 1, wherein the antenna is painted a reflective color.

8. The control device of claim 1, wherein the antenna comprises a planar driven element located between the light-guiding component and the printed circuit board.

9. The control device of claim 2, wherein the indicia is configured to extend from a first position on the front surface adjacent the curved portion to a second position on the front surface beyond the distal end of the light-guiding component, the distal end configured to illuminate the indicia located beyond the distal end of the light-guiding component.

10. The control device of claim 2, wherein the at least one indicia comprises a plurality of indicia arranged within a first area on the front surface, the planar portion of the light-guiding component defining a second area arranged such that an orthogonal projection of the second area onto the first area of the front surface is encompassed by the first area.

11. The control device of claim 2, wherein the distal end is curved or beveled to illuminate the front surface beyond the distal end.

12. The control device of claim 3, wherein the antenna comprises one or more openings configured to be substantially aligned with the one or more LEDs, the one or more protrusions extending through the one or more openings of the antenna.

13. The control device of claim 4, wherein the faceplate comprises a light-conductive body and opaque material provided on a front surface of the faceplate, and the indicia is engraved in the opaque material so as to be illuminated by the light transmitted by the light-guiding component to the front surface of the control device.

14. A control device comprising:
a removable faceplate configured to be mounted to the control device, the faceplate comprising a light-conductive body and an opaque material provided on a front surface of the faceplate, wherein at least one indicia is engraved in the opaque material;
a planar printed circuit board;
a structure located between the faceplate and the printed circuit board;
one or more side-firing LEDs mounted to the printed circuit board and configured to emit light along the plane of the printed circuit board via respective firing sides of the LEDs; and
a light-guiding component comprising a planar portion, a curved portion and a plurality of protrusions, the planar portion located between the faceplate and the structure, the curved portion extending between the LEDs on the printed circuit board and the planar portion, the plurality of protrusions extending through one or more openings of the structure and configured to reflect light emitted by the one or more side-firing LEDs towards the front surface of the faceplate, the curved portion comprising a front curved surface and a rear curved surface, the rear curved surface of the curved portion configured to receive light emitted by the one or more side-firing LEDs and reflect the light in multiple directions towards the front surface of the faceplate to illuminate the at least one indicia, the front curved surface of the curved portion configured to reflect light emitted by the one or more side-firing LEDs away from the front surface of the faceplate and towards the planar portion of the light-guiding component.

15. The control device of claim 14, further comprising:
an actuation member configured to extend through the faceplate and configured to receive a user input;
one or more LEDs mounted to the printed circuit board adjacent to the one or more side-firing LEDs; and
a control circuit, wherein the one or more LEDs are positioned adjacent to a rear surface of the actuation member and the control circuit is configured to cause the one or more LEDs to illuminate a front surface of the actuation member in response to receiving an input.

16. The control device of claim 15, wherein the structure comprises an antenna and the input comprises an actuation of the actuation member.

* * * * *

UNITED STATES PATENT AND TRADEMARK OFFICE
CERTIFICATE OF CORRECTION

| | |
|---|---|
| PATENT NO. | : 10,782,188 B2 |
| APPLICATION NO. | : 15/288861 |
| DATED | : September 22, 2020 |
| INVENTOR(S) | : William Taylor Shivell et al. |

It is certified that error appears in the above-identified patent and that said Letters Patent is hereby corrected as shown below:

On the Title Page

Under abstract "16 Claims, 16 Drawing Sheets" should read --25 Claims, 16 Drawing Sheets--

In the Claims

At Column 28, after Line 59, insert the following claims:
--17. The control device of claim 1, further comprising:
a yoke configured to mount the control device to an electrical wallbox;
a user interface configured to receive a user input;
a bezel configured to be attached to the yoke, the user interface provided through the bezel, wherein the planar portion of the light-guiding component is attached to the bezel;
one or more LEDs mounted on the printed circuit board; and
a control circuit responsive to the user input and the radio-frequency communication circuit;
wherein the light-guiding component comprises a beveled or curved end portion and a plurality of ridges on the front curved surface or the rear curved surface of the light-guiding component, and wherein the antenna comprises a planar driven element configured to be located between the light-guiding component and the PCB.

18. The control device of claim 17, wherein the light-guiding component further comprises one or more protrusions on the rear curved surface of the light-guiding component.

19. The control device of claim 18, wherein the one or more LEDs are configured to be substantially aligned with the one or more protrusions when the light-guiding component is installed in the control device.

20. The control device of claim 17, wherein the plurality of ridges are configured to disperse light generated by the one or more LEDs with substantial uniformity.

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*

21. The control device of claim 17, further comprising:
a faceplate configured to receive the user interface, the faceplate comprising a light-conductive body, and the light-guiding component configured to be located between the faceplate and the driven element.

22. The control device of claim 17, wherein the driven element comprises one or more openings configured to be substantially aligned with the one or more LEDs.

23. The control device of claim 17, wherein the light-guiding component further comprises one or more protrusions on the rear curved surface of the light-guiding component and the one or more openings in the driven element are configured to be substantially aligned with the one or more protrusions of the light-guiding component.

24. The control device of claim 23, wherein the one or more protrusions of the light-guiding component are configured to extend through the one or more openings of the driven element.

25. The control device of claim 17, wherein the one or more LEDs comprise one or more side firing LEDs.--